(12) United States Patent
Schuessler

(10) Patent No.: US 7,849,107 B2
(45) Date of Patent: Dec. 7, 2010

(54) DATA FORMAT FOR EFFICIENT ENCODING AND ACCESS OF MULTIPLE DATA ITEMS IN RFID TAGS

(75) Inventor: Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 302 days.

(21) Appl. No.: 11/806,050

(22) Filed: May 29, 2007

(65) Prior Publication Data

US 2007/0276984 A1    Nov. 29, 2007

Related U.S. Application Data

(60) Provisional application No. 60/808,532, filed on May 26, 2006, provisional application No. 60/810,176, filed on Jun. 2, 2006, provisional application No. 60/805,277, filed on Jun. 20, 2006.

(51) Int. Cl.
*G06F 17/30* (2006.01)
(52) U.S. Cl. .................. 707/803; 709/231
(58) Field of Classification Search .......... 707/803, 707/703; 705/28; 709/231; 711/100, 171
See application file for complete search history.

(56) References Cited

U.S. PATENT DOCUMENTS

| | | | |
|---|---|---|---|
| 6,201,474 B1 * | 3/2001 | Brady et al. | 340/572.8 |
| 6,480,100 B1 | 11/2002 | Frieden et al. | |
| 6,608,551 B1 | 8/2003 | Anderson et al. | |
| 6,617,962 B1 * | 9/2003 | Horwitz et al. | 340/10.4 |
| 7,040,532 B1 * | 5/2006 | Taylor et al. | 235/375 |
| 7,042,346 B2 * | 5/2006 | Paulsen | 340/438 |
| 7,049,963 B2 * | 5/2006 | Waterhouse et al. | 340/572.1 |
| 7,084,769 B2 * | 8/2006 | Bauer et al. | 340/572.7 |
| 7,116,212 B2 * | 10/2006 | Horwitz et al. | 340/10.1 |
| 7,131,596 B2 * | 11/2006 | Lapstun et al. | 235/494 |

(Continued)

FOREIGN PATENT DOCUMENTS

EP    1345183 A2    9/2003

(Continued)

OTHER PUBLICATIONS

Hughes Metras, RFID tags for ambient intelligence: present solutions and future challenges, 2005, sOc-EUSAI '05: Proceedings of the 2005 joint conference on Smart objects and ambient intelligence: innovative context-aware services: usages and technologies, pp. 43-46, retrieved from ACM digital library.*

(Continued)

*Primary Examiner*—Shahid A Alam
(74) *Attorney, Agent, or Firm*—Michael J. Giannetta; Clements Bernard PLLC

(57) ABSTRACT

Methods and systems for optimizing storage of data items in a memory of a radio frequency identification tag (RFID) are provided. The data structure for optimized storage includes a packed object having a length section including an indication of a number of identifiers in the packed object, an identifier section including a directory of indices representing an identifier for each data item contained within the packed object and a data section encoding a data portion associated with each data item included in the data section.

17 Claims, 23 Drawing Sheets

U.S. PATENT DOCUMENTS

| | | | |
|---|---|---|---|
| 7,161,489 B2 * | 1/2007 | Sullivan et al. | 340/572.4 |
| 7,196,613 B2 * | 3/2007 | Horwitz et al. | 340/10.1 |
| 7,267,275 B2 * | 9/2007 | Cox et al. | 235/451 |
| 7,268,684 B2 * | 9/2007 | Tethrake et al. | 340/572.1 |
| 7,302,490 B1 | 11/2007 | Gupta et al. | |
| 7,420,466 B2 * | 9/2008 | Shafer | 340/572.1 |
| 7,455,218 B2 * | 11/2008 | Shafer | 235/375 |
| 7,523,130 B1 | 4/2009 | Meadway et al. | |
| 2003/0174099 A1 * | 9/2003 | Bauer et al. | 343/893 |
| 2005/0071234 A1 * | 3/2005 | Schon | 705/22 |
| 2005/0177466 A1 | 8/2005 | Willins | |
| 2005/0230478 A1 | 10/2005 | Chapman et al. | |
| 2005/0270189 A1 | 12/2005 | Kaplan et al. | |
| 2006/0163350 A1 * | 7/2006 | Melton et al. | 235/435 |
| 2006/0289648 A1 * | 12/2006 | Shafer | 235/451 |
| 2008/0215461 A1 | 9/2008 | Bodin et al. | |

FOREIGN PATENT DOCUMENTS

| | | | |
|---|---|---|---|
| EP | 1398725 A2 * | 3/2004 | |
| GB | 2393076 A * | 3/2004 | |
| GB | 2406023 A * | 3/2005 | |
| GB | 2410151 A * | 7/2005 | |
| WO | 9835243 A2 | 8/1998 | |
| WO | WO 9835243 A2 * | 8/1998 | |
| WO | 2065380 A2 | 8/2002 | |
| WO | WO 02065380 A2 * | 8/2002 | |
| WO | 3021974 A1 | 3/2003 | |
| WO | WO 03021974 A1 * | 3/2003 | |
| WO | 2005073903 A1 | 8/2005 | |
| WO | WO 2005073903 A1 * | 8/2005 | |
| WO | 2005081086 A | 9/2005 | |
| WO | WO 2005081086 A1 * | 9/2005 | |

OTHER PUBLICATIONS

Roy Want, The magic of RFID, 2004, Queue, vol. 2 Issue 7, retrieved from ACM digital library.*

Search Report and Written Opinion for International Application No. PCT/US07/12554 mailed Jan. 15, 2008, 8 pages.

Hughes Metras, RFID tags for ambient intelligence: present solutions and future challenges, 2005, sOc-EUSAI '05: Proceedings of the 2005 join conference on Smart objects and ambient intelligence: innovative context-aware services: usages and technologies.

Roy Want, The magic of RFID, 2004, Queue, vol. 2 Issue 7, retrieved from ACM digital library.

Non Final Office Action for U.S. Appl. No. 11/806,050 mailed Jul. 24, 2009, a related application of U.S. Appl. No. 11/806,053.

Final Office Action from USPTO in U.S. Appl. No. 11/806,053, dated Apr. 19, 2010.

* cited by examiner

Table 1: Base Table of ID Byte values

| ID Byte value | AI | Data Title | Format | Fixed-Length Numeric | Variable length Bits | Variable length Range |
|---|---|---|---|---|---|---|
| 0 | 00 | SSCC | n2+n18 | 18 | | |
| 1 | 01 | GTIN™ | n2+n14 | 14 | | |
| 2 | 02 | CONTENT | n2+n 14 | 14 | | |
| 3 | 10 | BATCH/LOT | n2+an..20 | | | |
| 4 | 11 * | PROD DATE | n2+n6 | Cust:Date | | |
| 5 | 12' | DUE DATE | n2+n6 | Cust:Date | | |
| 6 | 13' | PACK DATE | n2+n6 | Cust:Date | | |
| 7 | 15' | BEST BEFORE or SELL BY | n2+n6 | Cust:Date | | |
| 8 | 17' | USE BY OR EXPIRY | n2+n6 | Cust:Date | | |
| 9 | 20 | VARIANT | n2+n2 | 2 | | |
| 10 | 21 | SERIAL | n2+an..20 | | | |
| 11 | 22 | QTY/DATE/BATCH | n2+an..29 | | | |
| 12 | 240 | ADDITIONAL ID | n3+an..30 | | | |
| 13 | 241 | CUST. PART NO. | n3+an..30 | | | |
| 14 | 250** | SECONDARY SERIAL | n3+an..30 | | | |
| 15 | 251 ** | REF. TO SOURCE | n3+an..30 | | | |
| 16 | 253 | DOC. ID | n3+n 13+n..17 | 13 | 5 | 0..17 |
| 17 | 30 | VAR. COUNT | n2+n..8 | | 3 | 1..8 |

FIG. 8A

Table 2 (continued): Base Table of ID Byte values

| ID Byte value | AI | Data Title | Format | Additional AuxID nibbles | Fix-Length Numeric | Variable length Bits | Variable length Range |
|---|---|---|---|---|---|---|---|
| 18-24 | 3 nn-31 nn | Metric Trade Measures AI's 310-319 | n4+n6 | 2 | 6 | | |
| 25-28 | 32nn-32nn | Non-Metric Trade Measures AI's 320-329 | n4+n6 | 2 | 6 | | |
| 29-35 | 33nn-33nn | Metric Logistic Measures AI's 330-336 | n4+n6 | 2 | 6 | | |
| 36-39 | 34nn-34nn | Non-Metric Logistic Measures AI's 340-349 | n4+n6 | 2 | 6 | | |
| 40-43 | 35nn-35nn | Non-Metric Trade Measures AI's 350-359 | n4+n6 | 2 | 6 | | |
| 44-47 | 36nn-36nn | Non-Metric Trade Measures AI's 360-369 | n4+n6 | 2 | 6 | | |
| 48 | 337n | KG PER m$^2$ | n4+n6 | 1 | 6 | | |
| 49 | 37 | COUNT | n2+n..8 | | | 3 | 1..8 |
| 50 | 390(n) | AMOUNT | n4+n..15 | 1 | | 4 | 0..15 |
| 51 | 391(n) | AMOUNT | n4+n3+n..15 | 1 | 3 | 4 | 0..15 |
| 52 | 392(n) | PRICE | n4+n..15 | 1 | | 4 | 0..15 |
| 53 | 393(n) | PRICE | n4+n3+n..15 | 1 | 3 | 4 | 0..15 |
| 54 | 400 | ORDER NUMBER | n3+an..30 | | | | |
| 55 | 401 | CONSIGNMENT | n3+an..30 | | | | |
| 56 | 402 | SHIPMENT NO. | n3+n 17 | | | 4 | 2..17 |
| 57 | 403 | ROUTE | n3+an..30 | | | | |
| 58 | 410 | SHIP TO LOC | n3+n13 | | 13 | | |
| 59 | 411 | BILL TO | n3+n13 | | 13 | | |
| 60 | 412 | PURCHASEFROM | n3+n13 | | 13 | | |
| 61 | 413 | SHIP FOR LOC | n3+n13 | | 13 | | |
| 62 | 414 | LOC No | n3+n13 | | 13 | | |
| 63 | 415 | PAY TO | n3+n13 | | 13 | | |
| 64 | 420 | SHIP TO POST | n3+an..20 | | | | |
| 65 | 421 | SHIP TO POST | n3+n3+an..9 | | | | |
| 66 | 422 | ORIGIN | n3+n3 | | 3 | | |
| 67 | 423 | COUNTRY-INITIAL PROCESS. | n3+n3+n..12 | | 3 | 4 | 0..12 |
| 68 | 424 | COUNTRY-PROCESS. | n3+n3 | | 3 | | |

FIG. 8B

| ID Byte value | AI | Data Title | Format | Additional AuxID nibbles | Fix-Length Numeric | Variable length Bits | Variable length Range |
|---|---|---|---|---|---|---|---|
| 69 | 425 | COUNTRY -- DISASS'Y | n3+n3 | | 3 | | |
| 70 | 426 | COUNTRY -- FULLPROCESS | n3+n3 | | 3 | | |
| 71 | 7001 | NSN | n4+n 13 | | 13 | | |
| 72 | 7002 | MEAT CUT | n4+an..30 | | | | |
| 73 | 703(s)*** | PROCESSOR | n4+n3+an..27 | 1 | | | |
| 74 | 8001 | DIMENSIONS | n4+n14 | | 14 | | |
| 75 | 8002 | CMT No | n4+an..20 | | | | |
| 76 | 8003 | GRAI | n4+n 14+an..16 | | | | |
| 77 | 8004 | GIAI | n4+an..30 | | | | |
| 78 | 8005 | PRICE PER UNIT | n4+n6 | | 6 | | |
| 79 | 8006 | GCTIN | n4+n14+n2+n2 | | 18 | | |
| 80 | 8007 | IBAN | n4+an..30 | | | | |
| 81 | 8008 | PROD TIME | n4+n8+n..4 | | 8 | 3 | 0..4 |
| 82 | 8018 | GSRN | n4+n18 | | 18 | | |
| 83 | 8020 | REF No | n4+an..25 | | | | |
| 84 | 810n | COUPONS | n4+various | 1 | | 3 | 2..9 |
| 85 | 90** | FACT DI 1 byte | n2+an..30 | 2 | | | |
| 86 | 90** | FACT DI 2byte | n2+an..30 | 4 | | | |
| 87 | 91-99** | INTERNAL | n2+an..30 | 1 | | | |
| 126 | 17/10 | For details, see separate table entries for AI 17 and AI 10 | | | | | |
| 127 | N/A | Extension pattern | N/A: next byte(s) define ID | | | | |

FIG. 8C

Table 3: Base Table of Trade/Logistics ID Byte values

| ID Byte value | AI | Data Title | Format | Add'l AuxID nibbles | Fix-Length Numeric | Variable length Bits | Variable length Range |
|---|---|---|---|---|---|---|---|
| 18 | 310n* | NET WEIGHT (kg) | n4+n6 | 1 | 6 | | |
| 19 | 311n | LENGTH (m) | n4+n6 | 1 | 6 | | |
| 20 | 312n | WIDTH (m) | n4+n6 | 1 | 6 | | |
| 21 | 313n | HEIGHT (m) | n4+n6 | 1 | 6 | | |
| 22 | 314n | AREA (m2) | n4+n6 | 1 | 6 | | |
| 23 | 315n | NET VOLUME (l) | n4+n6 | 1 | 6 | | |
| 24 | 316n | NET VOLUME (m3) | n4+n6 | 1 | 6 | | |
| 25 | 320n | NET WEIGHT (lb) | n4+n6 | 1 | 6 | | |
| 26 | 321n 322n 323n | LENGTH () [1st AuxID nibble is 1, 2, or 3] | n4+n6 | 2 | 6 | | |
| 27 | 324n 325n 326n | WIDTH () [1st AuxID nibble is 4, 5, or 6] | n4+n6 | 2 | 6 | | |
| 28 | 327n 328n 329n | HEIGHT () [1st AuxID nibble is 7, 8, or 9] | n4+n6 | 2 | 6 | | |
| 29 | 330n | GROSS WEIGHT | n4+n6 | 1 | 6 | | |
| 30 | 331n | LENGTH (m), log | n4+n6 | 1 | 6 | | |
| 31 | 332n | WIDTH (m), log | n4+n6 | 1 | 6 | | |
| 32 | 333n | HEIGHT (m), log | n4+n6 | 1 | 6 | | |
| 33 | 334n | AREA (m2), log | n4+n6 | 1 | 6 | | |
| 34 | 335n | VOLUME (l), log | n4+n6 | 1 | 6 | | |
| 35 | 336n | VOLUME (m3), log | n4+n6 | 1 | 6 | | |
| 36 | 340n | GROSS WEIGHT | n4+n6 | 1 | 6 | | |
| 37 | 341n 342n 343n | LENGTH () [1st AuxID nibble is 1, 2, or 3] | n4+n6 | 2 | 6 | | |
| 38 | 344n 345n 346n | WIDTH () [1st AuxID nibble is 4, 5, or 6] | n4+n6 | 2 | 6 | | |

FIG. 8D

| ID Byte value | AI | Data Title | Format | Add'l AuxID nibbles | Fix-Length Numeric | Variable length Bits | Variable length Range |
|---|---|---|---|---|---|---|---|
| 39 | 347n 348n 349n | HEIGHT () [1st AuxID nibble is 7, 8, or 9] | n4+n6 | 2 | 6 | | |
| 40 | 350n 351n 352n | AREA () [1st AuxID nibble is 0, 1, or 2] | n4+n6 | 2 | 6 | | |
| 41 | 353n 354n 355n | AREA (), log [1st AuxID nibble is 3, 4, or 5] | n4+n6 | 2 | 6 | | |
| 42 | 356n | NET WEIGHT (t) | n4+n6 | 1 | 6 | | |
| 43 | 357n | NET VOLUME oz | n4+n6 | 1 | 6 | | |
| 44 | 360n 361n | NET VOLUME liq [1st AuxID nibble is 0 or 1] | n4+n6 | 2 | 6 | | |
| 45 | 362n 363n | NET VOLUME [1st AuxID nibble is 2 or 3] | n4+n6 | 2 | 6 | | |
| 46 | 364n 365n 366n | NET VOLUME cu [1st AuxID nibble is 4, 5, or 6] | n4+n6 | 2 | 6 | | |
| 47 | 367n 368n 369n | VOLUME log, cu [1st AuxID nibble is 7, 8, or 9] | n4-n6 | 2 | 6 | | |

FIG. 8E

Base 30 Character set

| Value | Basic Set | | Shift 1 set | | Shift 2 set | | Shift 3 set | |
|---|---|---|---|---|---|---|---|---|
| | Char | Decimal | Char | Decimal | Char | Decimal | Char | Decimal |
| 0 | space | 32 | NUL | 0 | ! | 33 | | 96 |
| 1 | A | 65 | SOH | 1 | | 34 | a | 97 |
| 2 | B | 66 | STX | 2 | # | 35 | b | 98 |
| 3 | C | 67 | ETX | 3 | $ | 36 | c | 99 |
| 4 | D | 68 | EOT | 4 | % | 37 | d | 100 |
| 5 | E | 69 | ENQ | 5 | & | 38 | e | 101 |
| 6 | F | 70 | ACK | 6 | | 39 | f | 102 |
| 7 | G | 71 | BEL | 7 | ( | 40 | g | 103 |
| 8 | H | 72 | BS | 8 | ) | 41 | h | 104 |
| 9 | | 73 | HT | 9 | | 42 | | 105 |
| 10 | J | 74 | LF | 10 | + | 43 | j | 106 |
| 11 | K | 75 | VT | 11 | | 44 | k | 107 |
| 12 | L | 76 | FF | 12 | - | 45 | l | 108 |
| 13 | M | 77 | CR | 13 | | 46 | m | 109 |
| 14 | N | 78 | SO | 14 | / | 47 | n | 110 |
| 15 | O | 79 | SI | 15 | | 58 | o | 111 |
| 16 | P | 80 | DLE | 16 | | 59 | p | 112 |
| 17 | Q | 81 | DC1 | 17 | < | 60 | q | 113 |
| 18 | R | 82 | DC2 | 18 | = | 61 | r | 114 |
| 19 | S | 83 | DC3 | 19 | > | 62 | s | 115 |
| 20 | T | 84 | DC4 | 20 | ? | 63 | t | 116 |
| 21 | U | 85 | NAK | 21 | | 64 | u | 117 |
| 22 | V | 86 | SYN | 22 | [ | 91 | v | 118 |
| 23 | W | 87 | ETB | 23 | | 92 | w | 119 |
| 24 | X | 88 | CAN | 24 | ] | 93 | x | 120 |
| 25 | Y | 89 | EM | 25 | ^ | 94 | y | 121 |
| 26 | Z | 90 | SUB | 26 | _ | 95 | z | 122 |
| 27 | Shift 1 | N/A | ESC | 27 | RS | 30 | { | 123 |
| 28 | Shift 2 | N/A | FS | 28 | US | 31 | ~ | 124 |
| 29 | Shift 3 | N/A | GS | 29 | — | 126 | } | 125 |

FIG. 11

Base 74 Character set

| Value | Graphic | Name |
|---|---|---|
| 0 | | FNC1 |
| 1 | ! | Exclamation mark |
| 2 | " | Quotation mark |
| 3 | % | Percent sign |
| 4 | & | Ampersand |
| 5 | ' | Apostrophe |
| 6 | ( | Left parenthesis |
| 7 | ) | Right parenthesis |
| 8 | * | Asterisk |
| 9 | + | Plus sign |
| 10 | , | Comma |
| 11 | - | Hyphen/Minus |
| 12 | . | Full stop |
| 13 | / | Solidus |
| 14 | : | Colon |
| 15 | ; | Semicolon |
| 16 | < | Less-than sign |
| 17 | = | Equals sign |
| 18 | > | Greater-than sign |
| 19 | ? | Question mark |
| 20 | A | Capital letter A |
| 21 | B | Capital letter B |
| 22 | C | Capital letter C |
| 23 | D | Capital letter D |
| 24 | E | Capital letter E |
| 25 | F | Capital letter F |
| 26 | G | Capital letter G |
| 27 | H | Capital letter H |
| 28 | I | Capital letter I |
| 29 | J | Capital letter J |
| 30 | K | Capital letter K |
| 31 | L | Capital letter L |
| 32 | M | Capital letter M |
| 33 | N | Capital letter N |
| 34 | O | Capital letter O |
| 35 | P | Capital letter P |
| 36 | Q | Capital letter Q |
| 37 | R | Capital letter R |
| 38 | S | Capital letter S |
| 39 | T | Capital letter T |
| 40 | U | Capital letter U |
| 41 | V | Capital letter V |

FIG. 12A

| Value | Graphic | Name |
|---|---|---|
| 42 | W | Capital letter W |
| 43 | X | Capital letter X |
| 44 | Y | Capital letter Y |
| 45 | Z | Capital letter Z |
| 46 | _ | Low line |
| 47 | a | Small letter a |
| 48 | b | Small letter b |
| 49 | c | Small letter c |
| 50 | d | Small letter d |
| 51 | e | Small letter e |
| 52 | f | Small letter f |
| 53 | g | Small letter g |
| 54 |  | Small letter h |
| 55 | i | Small letter i |
| 56 | j | Small letter j |
| 57 | k | Small letter k |
| 58 | l | Small letter l |
| 59 | m | Small letter m |
| 60 | n | Small letter n |
| 61 | o | Small letter o |
| 62 | p | Small letter p |
| 63 | q | Small letter q |
| 64 | r | Small letter r |
| 65 | s | Small letter s |
| 66 | t | Small letter t |
| 67 | u | Small letter u |
| 68 | v | Small letter v |
| 69 | w | Small letter w |
| 70 | x | Small letter x |
| 71 | y | Small letter y |
| 72 | z | Small letter z |
| 73 |  | Space |

FIG. 12B

```
/* Digits encoding accepts up to 60 input values per group: */ static const
unsigned char bitsForNumDigits[] = {
/*  0 -  9 */   0,   4,   7,  10,  14,  17,  20,  24,  27,  30,
/* 10 - 19 */  34,  37,  40,  44,  47,  50,  54,  57,  60,  64,
/* 20 - 29 */  67,  70,  74,  77,  80,  84,  87,  90,  94,  97,
/* 30 - 39 */ 100, 103, 107, 110, 113, 117, 120, 123, 127, 130,
/* 40 - 49 */ 133, 137, 140, 143, 147, 150, 153, 157, 160, 163,
/* 50 - 59 */ 167, 170, 173, 177, 180, 183, 187, 190, 193, 196,
/* 60 - 60 */ 200  };

/* Base30 encoding accepts up to 39 input values per group: */ static const
unsigned char bitsForNumBase30[] = {
/*  0 -  9 */   0,   5,  10,  15,  20,  25,  30,  35,  40,  45,
/* 10 - 19 */  50,  54,  59,  64,  69,  74,  79,  84,  89,  94,
/* 20 - 29 */  99, 104, 108, 113, 118, 123, 128, 133, 138, 143,
/* 30 - 39 */ 148, 153, 158, 162, 167, 172, 177, 182, 187, 192

/* Base118 encoding accepts up to 29 input values per group: */ static const
unsigned char bitsForNumBase118[] = {
/*  0 -  9 */   0,   7,  14,  21,  28,  35,  42,  49,  56,  62,
/* 10 - 19 */  69,  76,  83,  90,  97, 104, 111, 118, 124, 131,
/* 20 - 29 */ 138, 145, 152, 159, 166, 173, 179, 186, 193, 200
};

/* Base74 encoding accepts up to 32 input values per group: */
static const unsigned char bitsForNumBase74[] = {
/*  0 -  9 */    0,   7,  13,  19,  25,  32,  38,  44,  50,  56,
/* 10 - 19 */   63,  69,  75,  81,  87,  94, 100, 106, 112, 118,
/* 20 - 29 */  125, 131, 137, 143, 150, 156, 162, 168, 174, 181,
/* 30 - 32 */  187, 193, 199  };
```

FIG. 13

| Prefix Present | Suffix Present | Prefix Numeric | Prefix Non-Numeric | Suffix Numeric | Suffix Non-Numeric | DigitsCount | NonDigitsCount |
|---|---|---|---|---|---|---|---|
| 1 | 1 | 1 | 0 | 1 | 0 | $DC = P_N + S_N$ | $NDC = 0$ |
| 1 | 1 | 1 | 0 | 0 | 1 | $DC = P_N$ | $NDC = S_{NN}$ |
| 1 | 1 | 0 | 1 | 1 | 0 | $DC = S_N$ | $NDC = P_{NN}$ |
| 1 | 1 | 0 | 1 | 0 | 1 | $DC = 0$ | $NDC = P_{NN} + S_{NN}$ |
| 0 | 1 | N/A | N/A | 1 | 0 | $DC = S_D$ | $NDC = 0$ |
| 0 | 1 | N/A | N/A | 0 | 1 | $DC = 0$ | $NDC = S_{NN}$ |
| 1 | 0 | 1 | 0 | N/A | N/A | $DC = P_N$ | $NDC = 0$ |
| 1 | 0 | 0 | 1 | N/A | N/A | $DC = 0$ | $NDC = P_{NN}$ |

FIG. 16

DATA FORMAT FOR EFFICIENT ENCODING AND ACCESS OF MULTIPLE DATA ITEMS IN RFID TAGS

CROSS-REFERENCE TO RELATED APPLICATIONS

The application claims the benefit of U.S. Provisional Application No. 60/808,532, filed May 26, 2006, U.S. Provisional Application No. 60/810,176, filed Jun. 2, 2006, and U.S. Provisional Application No. 60/805,277, filed Jun. 20, 2006, each of which is incorporated by reference herein in its entirety.

FIELD OF THE INVENTION

The invention relates to radio frequency identification (RFID) technology, and in particular, to a data format for efficient encoding and decoding of user data in RFID tags.

BACKGROUND OF THE INVENTION

Radio frequency identification (RFID) tags are electronic devices that may be affixed to items whose presence is to be detected and/or monitored. A variety of tag classes have been defined by national and international standards bodies (e.g., EPCGlobal and ISO). The tag classes include Class 0, Class 1, and Class 1 Generation 2 (referred to herein as "Gen 2"). The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed as "reader interrogator" or simply "interrogator."

With the maturation of RFID technology, efficient communication between tags and interrogators has become a key enabler in supply chain management, especially in manufacturing, shipping, and retail industries, as well as in building security installations, healthcare facilities, libraries, airports, warehouses etc.

In addition, tags include limited amounts of memory for encoding user data. Existing standard data formats (e.g., as specified by ISO/IEC 15961 and 15962) do not offer good compaction efficiency, nor do they offer fast random access to a desired data element. In addition, Gen 2 standards limit the data systems which can be used to label data items. This limits the ability of users of Gen 2 tags to encode data items labeled with GSI Application Identifiers (AIs), whereas others want to use Data Identifiers (DIs), and others will want to intermix the two. Furthermore, the Gen 2 air interface protocol does not provide a good mechanism for accessing a variable amount of memory, without requiring multiple operations of the same tag. In current Gen-2 implementations, the only options are (1) read the entire memory bank which may cause the tag to emit a very large number of useless '0' bits, slowing down the process for reading a population of tags, or (2) read a selected number of memory words. The problem with alternative (2) is that, if too many words are requested, the tag returns an error code with no indication of how many words would have been available had the Read command not asked for too many.

EPCglobal recently announced the Tag Data Standards for Gen 2 RFID tags. However, there is no standard which provides a format definition for user memory bank 11 in the ISO 18000-6C specifications. That is, the Gen 2 format cannot be applied to ISO 18000-6c tags, and vice versa. The existing ISO format requires modification before it can be applied to Gen 2 tags, in part because the ISO method treats all of tag memory as one continuous address space. In contrast, Gen 2 tags segment memory into four mutually-exclusive segments. A serious problem in applying known formats such as ISO to Gen 2 tags is the need to support an efficient Read command (that is, one that ideally transfers no more bits over the air than is necessary to search for the desired tag data elements). In this regard, Gen 2 is a particular challenge, because a Gen 2 Read command has only two "length" options when reading User Memory 400: either a length of "0" is requested (in which case the tag emits the entire contents of that memory bank, even if it is all or mostly unused and empty), or a specific read length is requested, in which case the Read command fails if too many words of data are requested.

To pre-establish the memory capacity of a given Gen 2 tag (tags from different manufactures, or even from the same manufacturer, will have different capacities) extra reads (for example, of a Gen 2 tag's Tag Identifier (TID) segment), plus a table lookup, are required. Moreover, existing format standards such as the ISO standard do not include encoding of the number of bytes of tag memory that currently hold user data. In short, the standard formats do not indicate an optimal read length (based on how many bytes actually contain user data), nor do they even indicate a "safe" length for a Read command of the User Memory 11 (at least, not without an additional Read of the TID bank).

The ISO standards assume explicitly, when considering tags that don't have an explicit tag-wide Directory section, that a reader would read the entire memory contents of each singulated tag in one Read operation, then parse through the copy of the data now in interrogator memory, in order to decode the data and/or identify whether the tag contains specific data ID's of interest to the application. But of course, this basic approach does nothing to minimize the time it takes to transfer bits over the air from the tags.

Thus, what is needed are ways to format tag data to minimize the bits read from the tag in both of the above scenarios thereby increasing the communication speed between a reader and a population of RFID tags.

What is further needed is a data format which enables a reader to quickly read a population of tags, and obtain only pre-selected data items of interest to the application, while minimizing the number of bits transmitted from the tag (in order to speed up the process).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 8A-E depict a series of AI header tables, according to embodiments of the present invention.

Figure 9:
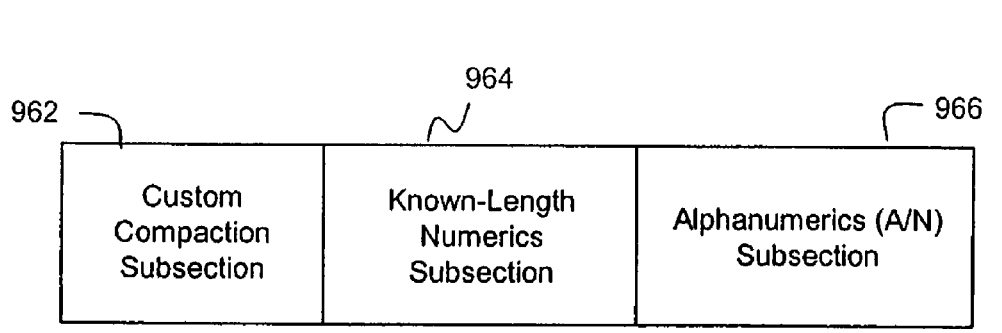

FIG. 9 depicts an exemplary data section, according to embodiments of the present invention.

Figure 10:
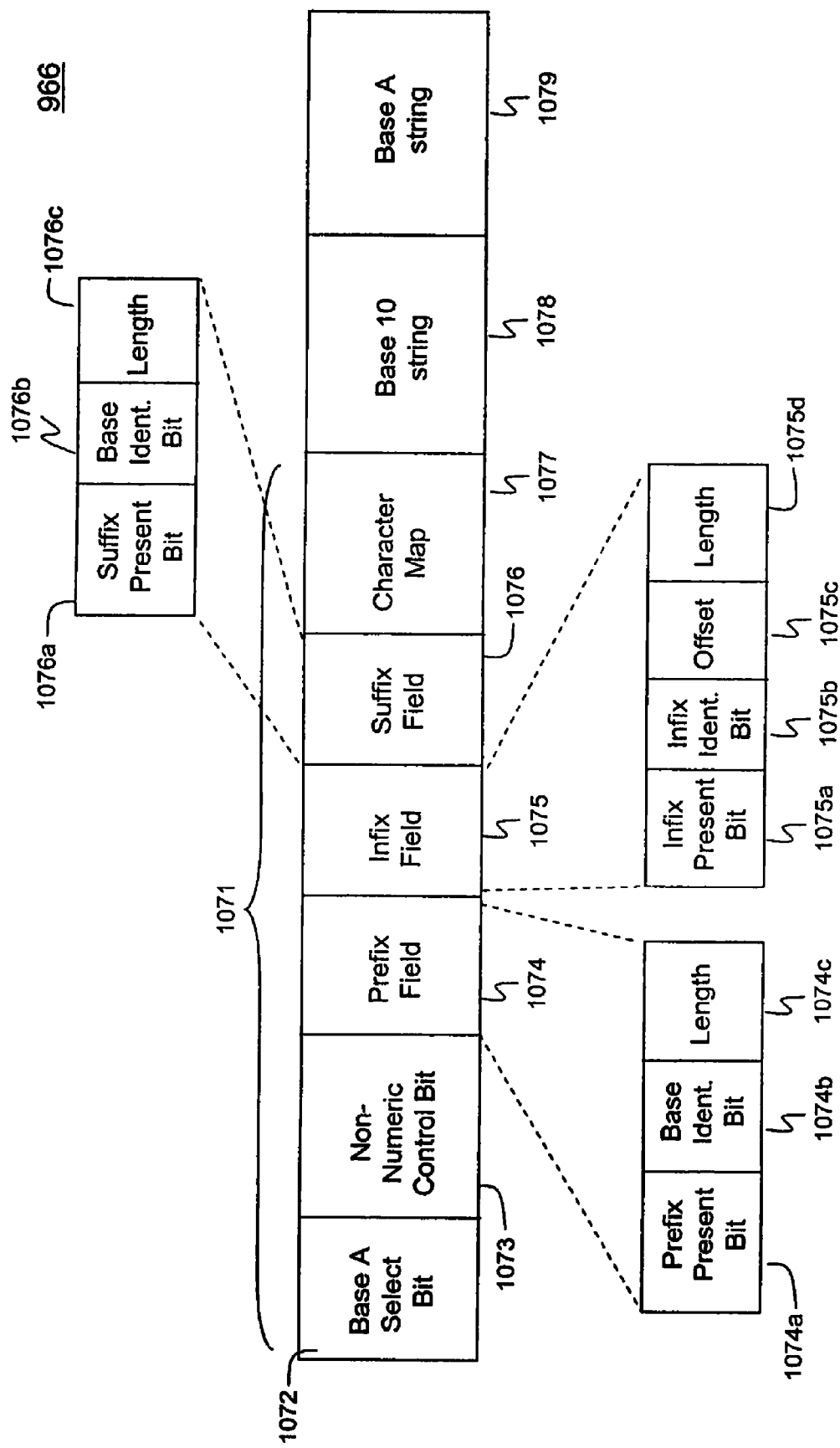

FIG. 10 depicts an exemplary A/N subsection, according to embodiments of the present invention.

FIG. 11 illustrates the Base 30 character set.

FIGS. 12A-B illustrate the Base 74 character set.

FIG. 13 depicts the number of bits required to encode various Base 10, Base 30, Base 74, and Base 118 characters, according to embodiments of the present invention.

Figure 14A:
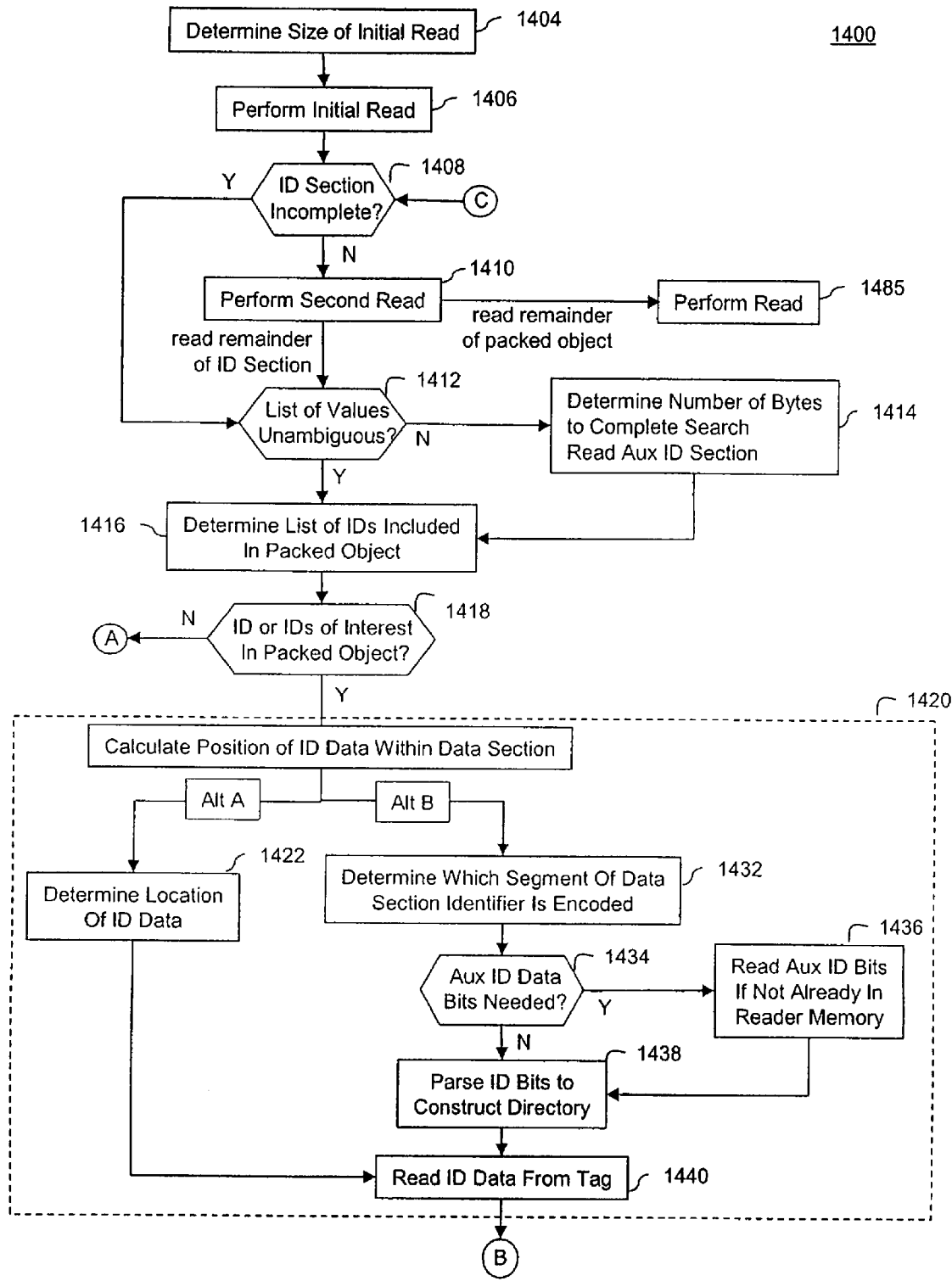
Figure 14B:
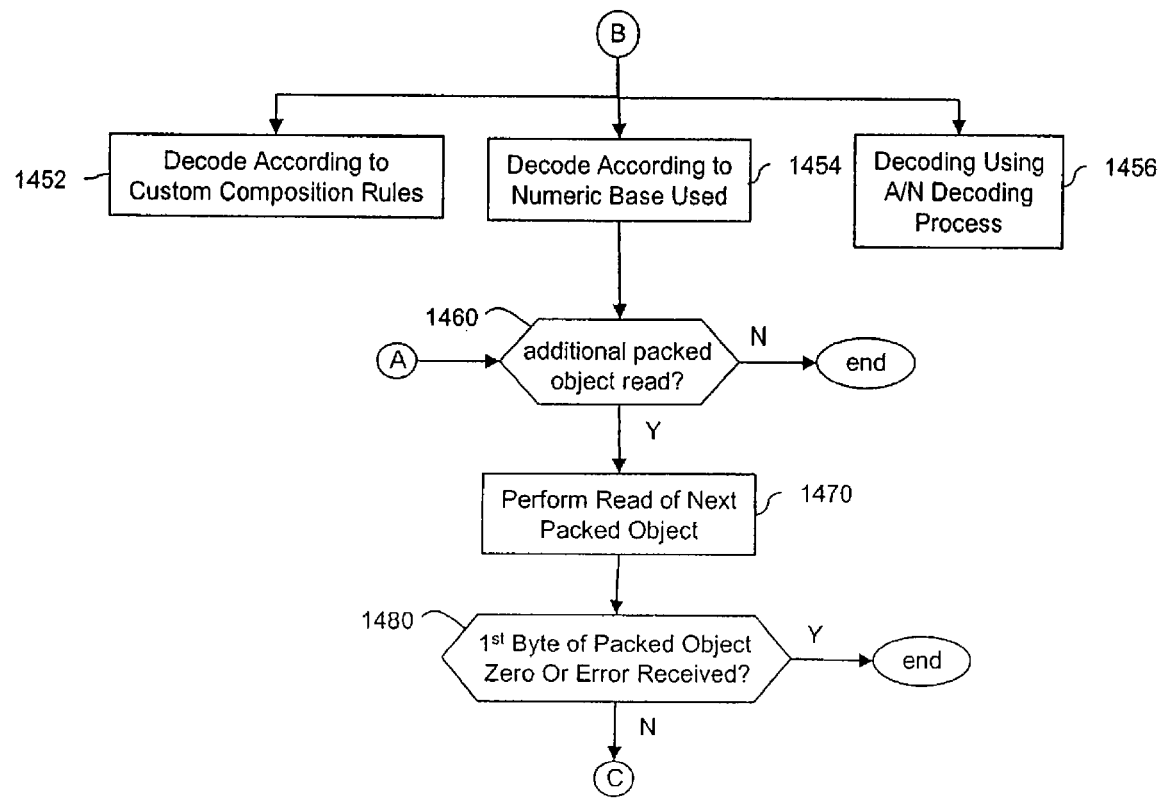
Figure 15A:
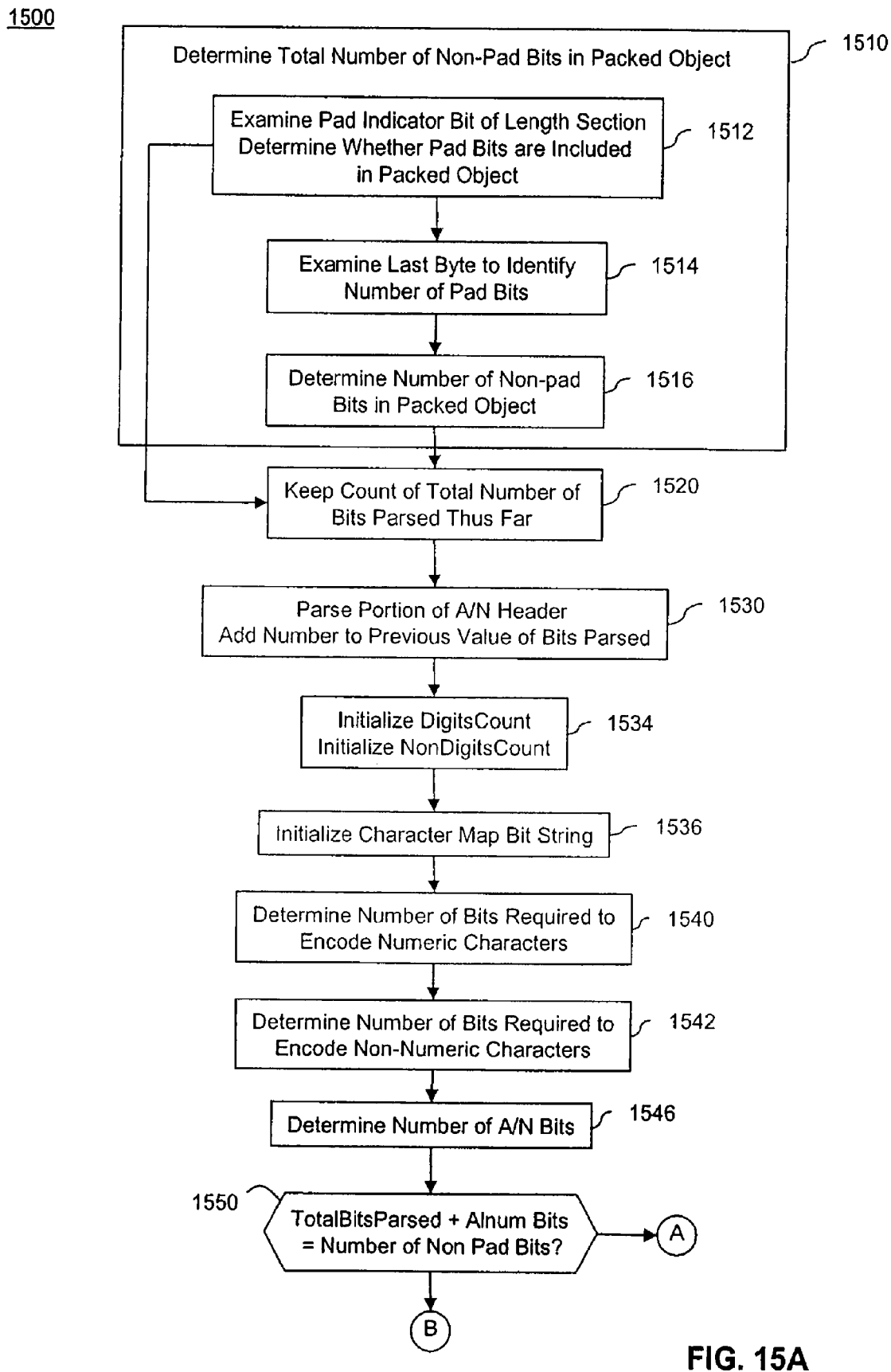
Figure 15B:
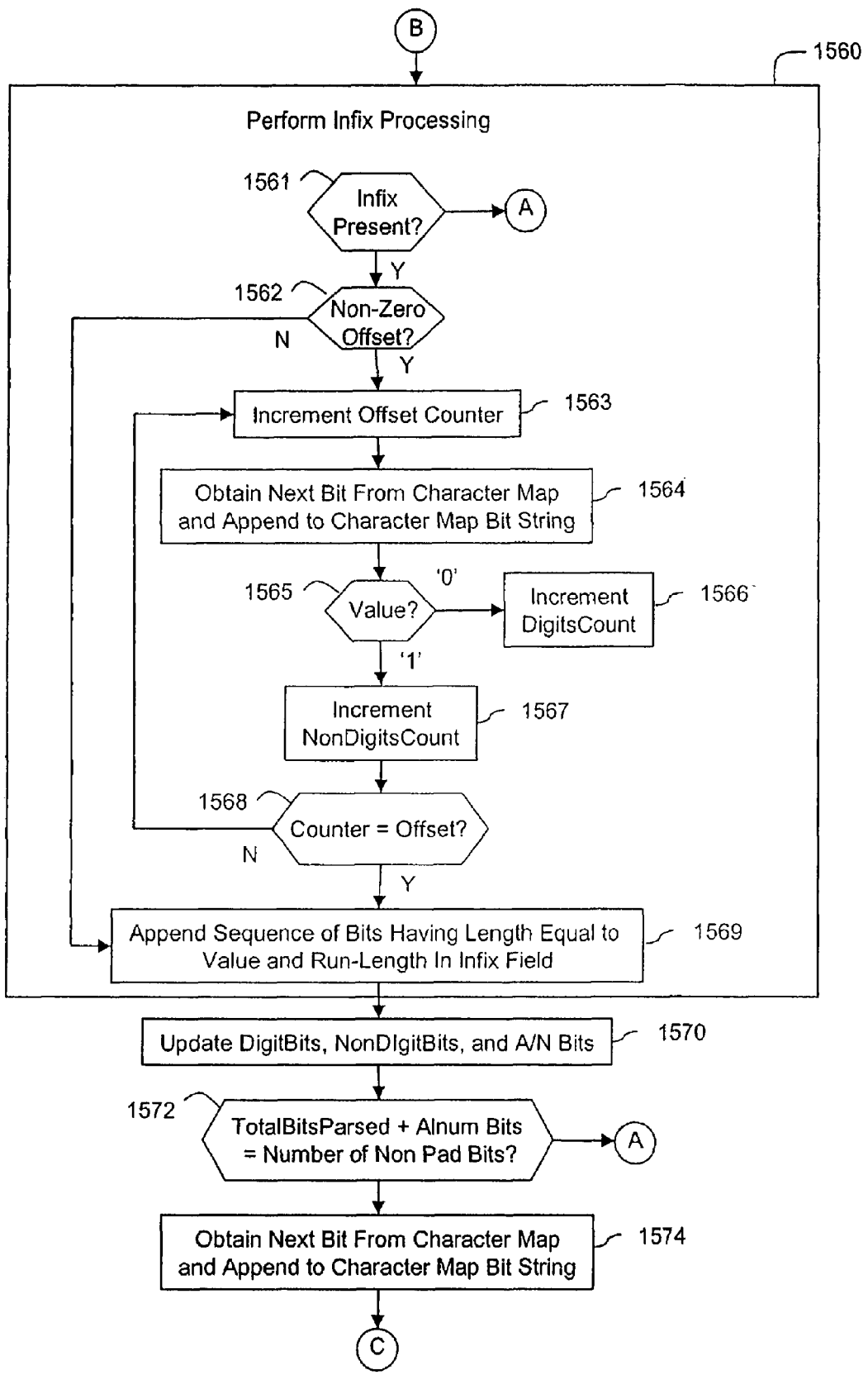
Figure 15C:
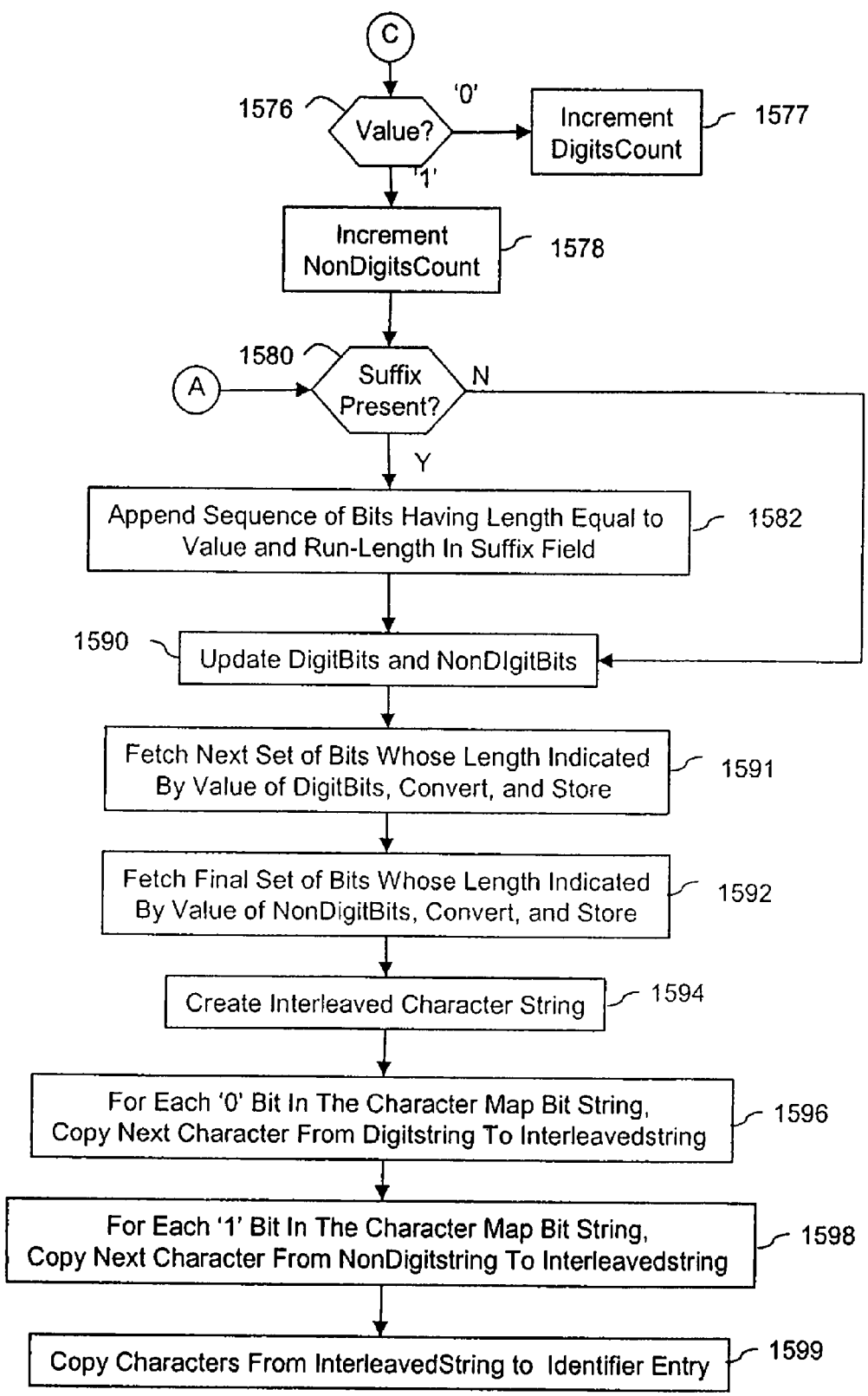

FIGS. 14A-B depict a flowchart of an exemplary method for optimizing a random access read of tags having packed object configurations, according to embodiments of the present invention FIGS. 15A-C depict a flowchart of an exemplary method for decoding an alphanumeric subsection of a packed object, according to embodiments of the present invention.

FIG. 16 illustrates a table showing the initialization values for DigitsCount and NonDigitsCount, according to embodiments of the present invention.

Figure 17:
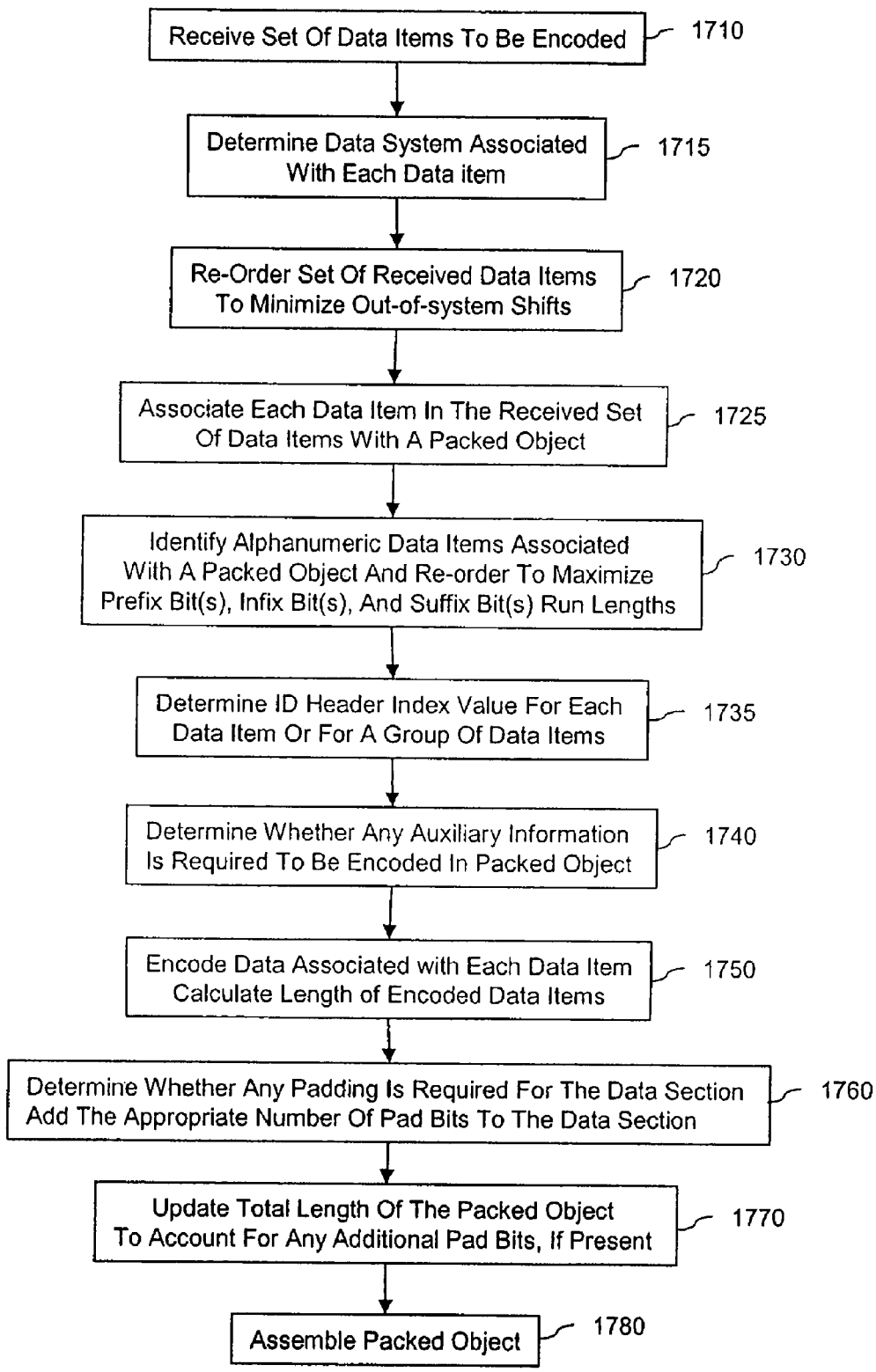

FIG. 17 depicts a flowchart of an exemplary high-level method for encoding a packed object, according to embodiments of the present invention.

Figure 18:
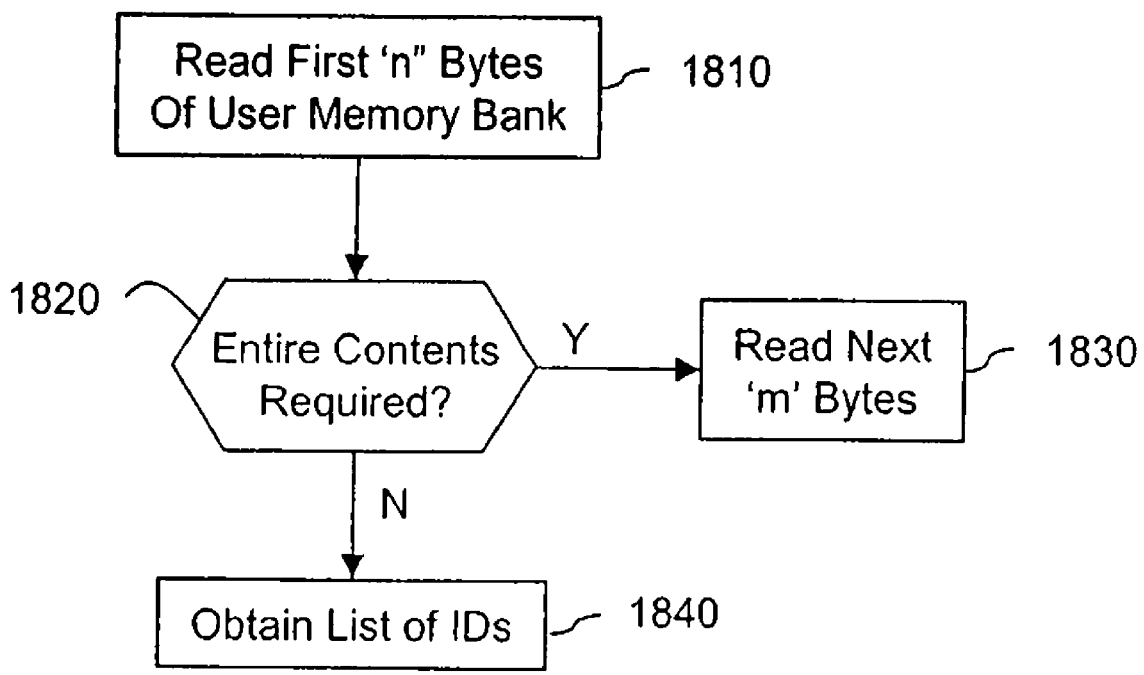

FIG. 18 depicts a flowchart of an exemplary method for reading a packed object tag using the direct approach, according to embodiments of the present invention.

DETAILED DESCRIPTION OF THE INVENTION

1. Exemplary Operating Environment

Figure 1:
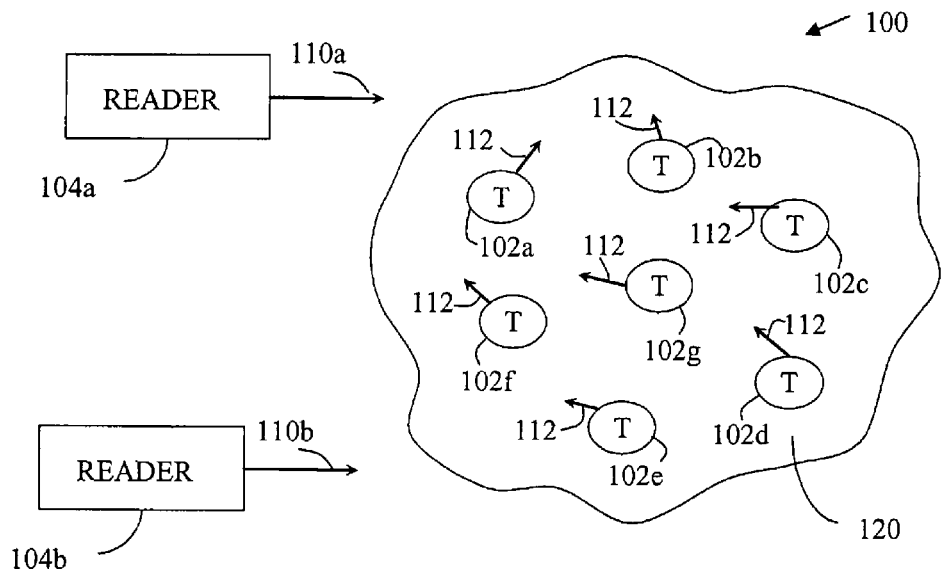
FIG. 1 shows an environment where RFID readers communicate with an exemplary population of RFID tags.

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110a having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols. Additionally, tag population 120 may include one or more tags having the packed object format described herein and/or one or more tags not using the packed object format (e.g., standard ISO tags).

Figure 2:
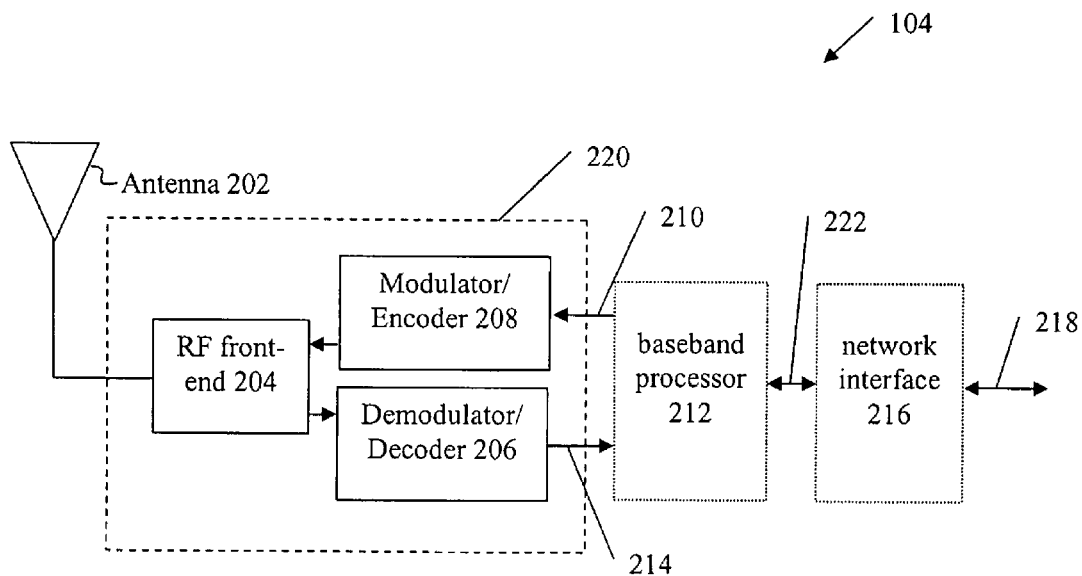
FIG. 2 shows a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
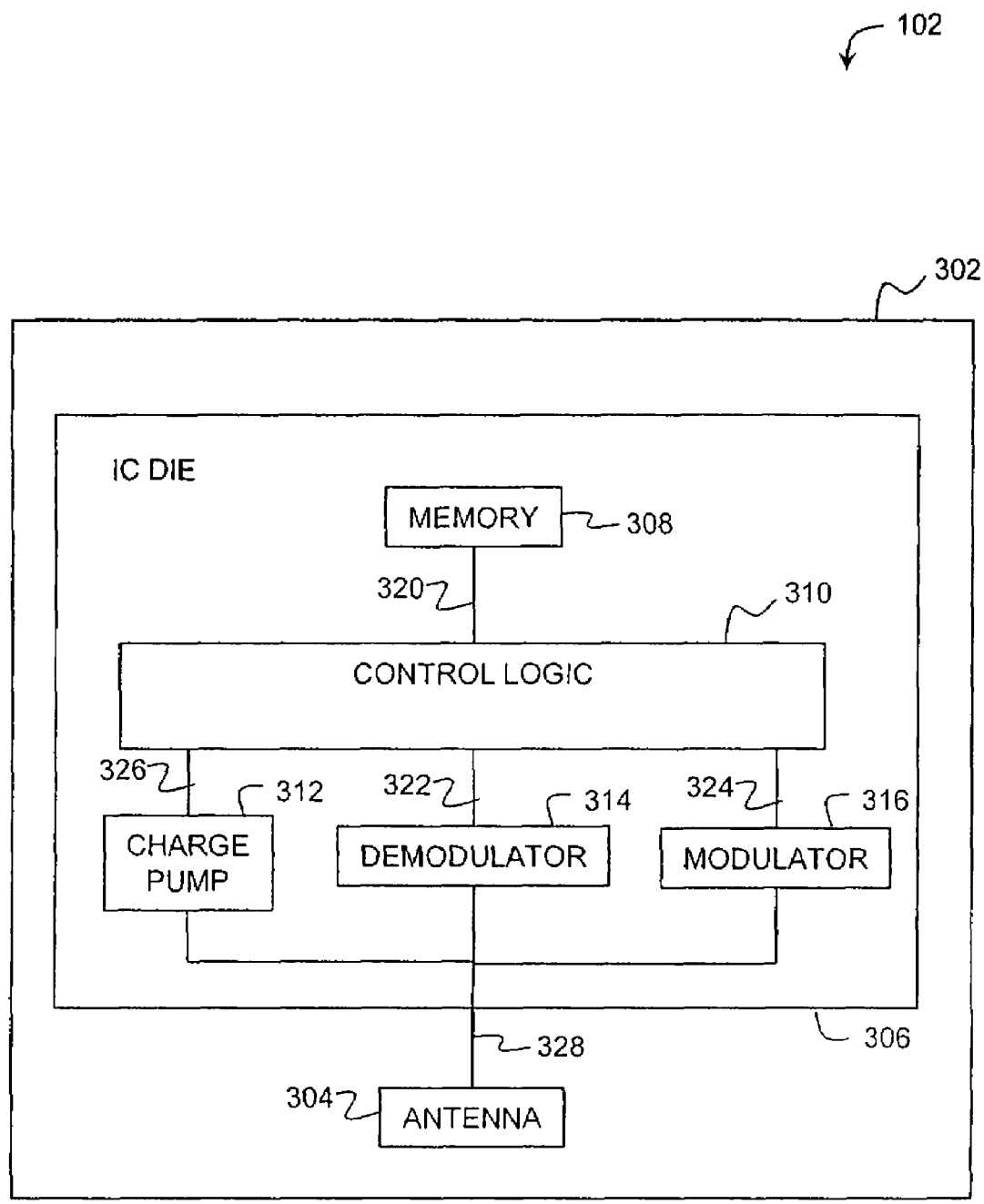
FIG. 3 shows a block diagram of an exemplary radio frequency identification (RFID) tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 is used to power circuits of IC die 306, including control logic 320.

Charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by battery).

Figure 4:
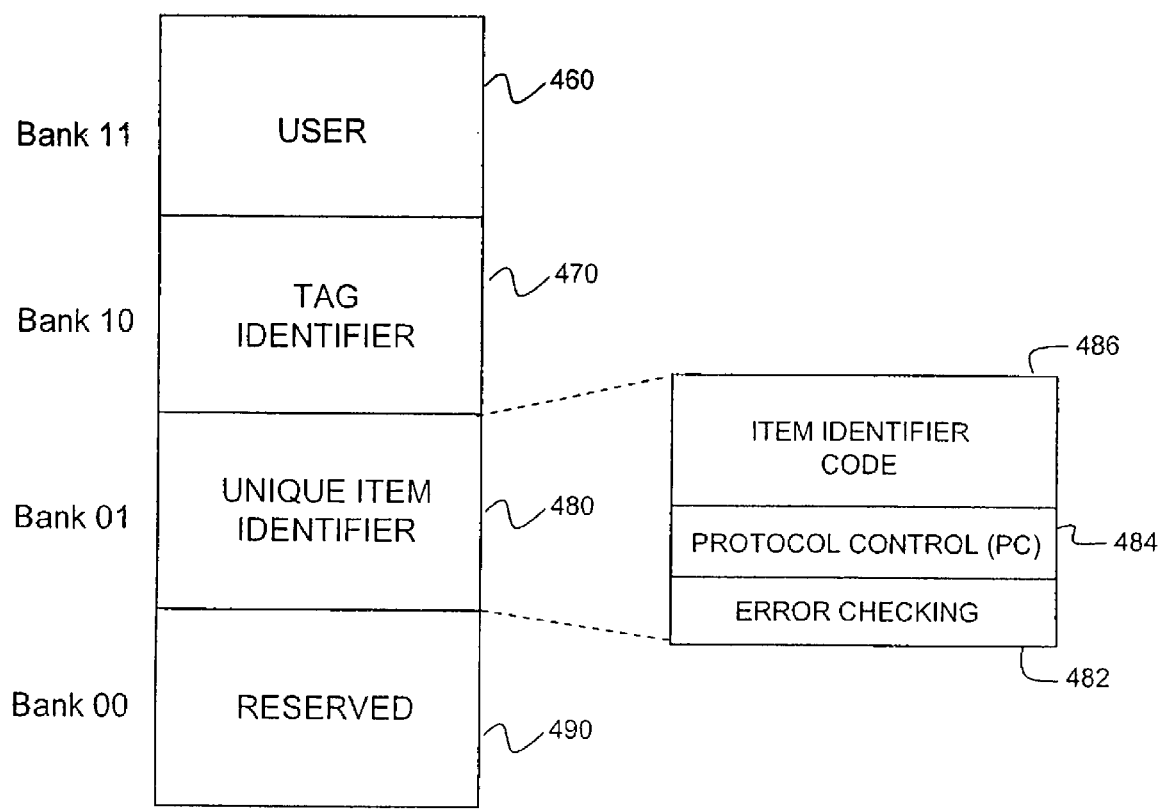
FIG. 4 depicts an exemplary logical memory map for a Gen-2 tag memory.

Memory 308 is typically a non-volatile memory, but can alternatively be a volatile memory, such as a DRAM. Memory 308 stores data, including an identification number 318. In a Gen-2 tag, tag memory 308 may be logically separated into four memory banks. FIG. 4 depicts an exemplary logical memory map 400 for a Gen-2 tag memory 308. Tag memory 308 includes a user memory bank 460 (bank 11), a tag identifier bank 470 (bank 10), a user item identifier bank 480 (bank 01), and a reserved bank 490 (bank 00). Each bank may have any number of memory words. Additionally, the format of one or more memory banks may be established by an industry, governmental, standards, or other similar type of organization.

User memory bank 460 is configured for user-specific data storage. User memory bank 460 is described in further detail in Section 2 below. Tag identifier (TID) bank 470 is configured to store identification information for a tag. For example, TID bank 470 may store an allocation class identifier for the tag and information regarding the unique commands and/or optional features supported by the tag. Unique Item Identifier (UII) bank 480 is configured to store an error checking code 482 (e.g., a CRC-16), protocol control (PC) bits 484, and an item identifier code 486. In an embodiment, PC bits 484 include one or more application family identifier (AFI) bits (e.g., PC bit 17). Item identifier code 486 may identify the object to which the tag is attached. Reserved bank 490 is configured to store the kill and access passwords for a tag.

2. User Memory Bank

This section describes an exemplary format definition for a user memory bank 460 in RFID tags (e.g., in ISO 18000-6C tags). The format may be used when encoding user data according to specifications defined by another standards organization (such as EPCglobal). The exemplary format is designed to maintain basic backward compatibility with tags formatted according to a specific standard(s) (e.g., ISO/IEC 15962-formatted tags), but offers increased encoding efficiency. The user memory format and associated encoding and decoding methods described herein are extensible to memories of any size, but bit efficiency may be optimized for memories under 1K bits. Regardless of available memory sizes, air-interface Write and Read times need to be minimized. It is assumed that encoding or decoding time using today's CPUs will be insignificant compared to air-interface time. According to one embodiment of the invention, a solution can utilize a fairly complex encoding and decoding algorithm if it minimizes the number of encoded bits for a given data set that need to be transferred over the air interface.

Figure 5:
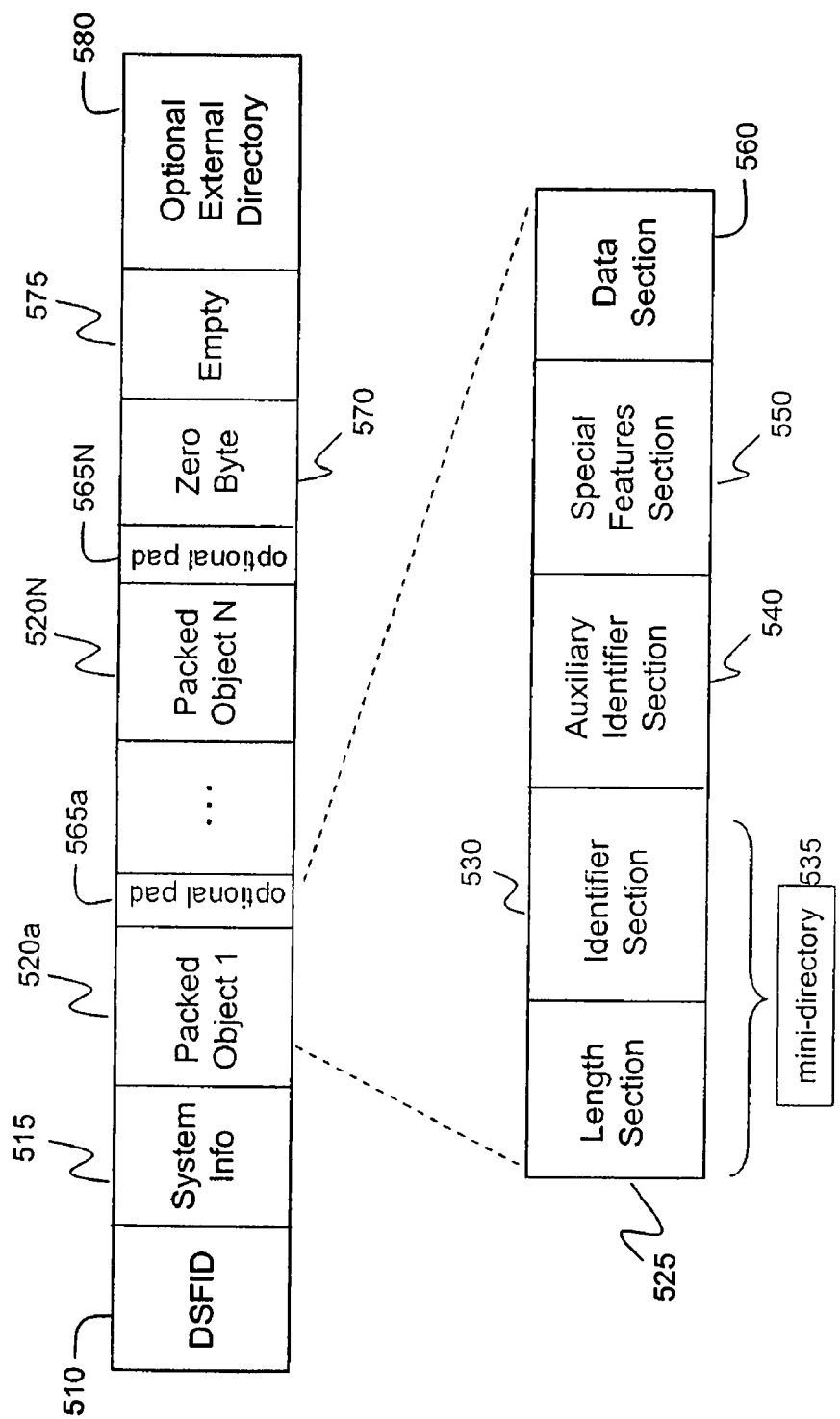
FIG. 5 depicts a high-level format for a user memory bank of an RFID tag, according to embodiments of the invention.

FIG. 5 depicts a high-level format for user memory bank 460 of an RFID packed object tag, according to embodiments of the invention. User memory bank 460 includes an optional data storage format identifier (DSFID) 510, a system information field 515, one or more packed objects 520a-n, an optional zero byte 570, an optional empty field 575, and an optional external directory 580. Optional pads 565a-n may be included between any two packed objects 520 or after the last packet object 520n and zero byte 570. Optional pads 565 are used for aligning various parts of user memory bank 500. Optional pads 565 are signaled by using an otherwise-invalid pattern in the initial bits (e.g., initial 6 bits) of what would be the second or subsequent packed object 520. For example, a value of 100100BB may be encoded in optional pads 565a to align the next packed object 520b. Such alignment can be useful for many purposes, including simpler access using word-aligned reads, better ability to apply passwords or otherwise control access to complete packed objects 520a-n, and more efficient indexing and random access to packed objects 520a-n via use of an optional external directory 580.

DSFID 510 is described in further detail in Section 2.1 below. Packed objects 520a-n are described in further detail in Section 2.2 below. Optional zero byte 570 may be included in embodiments which do not include a parser capable of parsing the packet object format described herein. In these embodiments, a zero-value is encoded in zero byte 570. Although depicted after the last packed object 520n in FIG. 5, the zero byte may alternatively precede the first packed object 520a. The zero-valued zero-byte looks like a terminating Precursor to these parsers (e.g., a standard ISO parser).

User memory bank 460 may also include a system information section 515. System information section 515 may include hardware or system information about the tag and/or sensor information if the tag has an associated sensor.

User memory bank 460 may also include a variable number of empty bytes 575 followed by an optional external directory 580. Although depicted as following empty bytes 575, external directory 580 may be located at the front of user memory bank 460 or at the end of the series of packed objects 520. Optional external directory is described in further detail below in Section 2.3. Note that one or more bytes may be included following the DSFID 510. For example, these bytes may be reserved for a specific current use or marked for future use.

Note that packed object tags can be intermixed in a tag population with non-packed object tags. This highlights the backward compatibility feature of the user memory bank format described herein. Therefore, packed object tags, if unformatted, begin with a first byte of zero. If formatted, packed object tags include the necessary set of information (as described in Section 2.1 below) to indicate their configuration (i.e., packed object) to a reader.

2.1 Data Storage Format Identifier (DSFID)

DSFID 510 includes information related to the organization and encoding of data in user memory bank 460. A variety of techniques could be used with the present invention to indicate the organization and encoding of data in user memory bank 460.

In a first technique, the DSFID 510 includes an access method field, a data format field, and an optional extension bit. The access method identifies how the tag is organized. For example, one value of the access method bits (e.g., 10 or 11) may be used to identify that the tag uses packed objects. In an embodiment, the access method is encoded in the most significant two bits of the DSFID 510. The data format field (i.e., the lower bits of DSFID 510) indicates the data system used to format the data stored in user memory bank 460. Note that multiple data systems may be used to encode data within the same tag's user memory bank 460. In this embodiment, the data format field indicates a default data format used throughout the remainder of the user memory bank 460. However, internal to a given packed object 520, this default can be changed. For example, the ID value in the first position of the identifier section 530 may be used to change the default data system. For example, the AI Header record for the first ID value may be a shift entry used to indicate a shift to a different default data system (e.g., DI or TEI). In this case, the remaining IDs listed within the packed object's ID section 530 default to the same data system as the first-listed ID.

ISO/IEC 15961 currently defines values for data format indicators (see e.g., section 7.1.2.5). In an embodiment, the DSFID 510 generally uses the same list of data format assignments and numerical values as defined in ISO/IEC 15961 with a few exceptions. The value of zero, which is defined in ISO as "unassigned or unformatted," has the same meaning in DSFID 510. In ISO 15961/15962, the values "1" through "8" use traditional arc-based Object Identifiers, which cannot be used verbatim with the packed object tag format. Moreover, even ISO formats such as "9" for European-International Uniform Code Council (EAN.UCC) or "10" for DI's cannot use the packed object ID Value index, unless a corresponding ID header table is defined.

For these values, a variety of assignment approaches can be used. In a translation approach, data format value of "1" indicates ISO format "9," a value of "2" indicates "10," and so forth. If a corresponding Header table has not been defined, than each ID is expressed as an "escape" index, indicating that the full ID is textually encoded later in the ID segment of the packed object. These "translated" values (e.g., where ISO format "9" is indicated by a value of "1"), may be encoded as EBV-3 extensible bit vectors, so that the first three usable ISO assignments (such as for EAN/UCC (now GS1, administering AI's), ANSI (administering DI's), and IATA are encoded in three bits. The next four assignments require six bits, the, following four will require nine bits, and so on. Alternate schemes for "favoring" the initial assignments would be readily apparent to those skilled in the art (such as a Huffman-like scheme, that as an example encodes the first four assignments as bit patterns of '0', '10', '1100', and '1101' respectively).

In an alternate approach, only data systems with defined Header tables would be supported. In this case, the packed object data format values would not correspond directly to the ISO format values, but instead would be sequentially assigned as new tables are defined.

The optional extension bit of DSFID 510 may be used to indicate whether user memory bank 460 includes system information (sensor information) field 515. In an embodiment, the DSFID 510 of the first technique is formatted according to a national or international standard such as ISO/IEC 15961 and 15962.

One data system that may be utilized in a packed object 520 is application identifiers (AIs). AIs are a finite set of identifiers used to connect physical and logical things to information about them. Each AI includes a two or more digit prefix used to identify the context of the data (e.g., serial shipping container code, global trade item number, etc.). AIs are typically assigned and maintained by a national or international standards setting or trade organization (such as GS1). Another data system that may be utilized is data identifiers (DIs) (also referred to as "FACT data identifiers"). A DI may be a single alphanumeric character or an alphanumeric character prefixed by one or more numeric characters. DIs are also typically assigned and maintained by a national or international standards setting or trade organization (such as ANSI). As would be appreciated by persons of skill in the art, data systems other that AI and DI could be used in the present invention. Although the format described herein is optimized for AIs, the format also supports a mix of AIs, DIs, and other data systems within a tag's user memory bank 460. This AI-centric format facilitates a mirror-image DI-centric design having a different DSFID assignment.

In a second technique, a combination of an abbreviated DSFID 510 and one or more bits from the PC bits of UII memory bank 480 can be used to indicate the organization and encoding of data. In this technique, the DSFID 510 includes only the access method field. In an embodiment, the access method field is two bits. As in the first technique, one value of the access method bits (e.g., '10' or '11') may be used to identify that the tag uses packed objects. One or more bits in the PC bits of UII memory bank 480 are used to identify the data system used for packed objects 520*a-n*. For example, a default data system could be defined for user memory bank 460. The value of the application format identifier (AFI) bit (e.g., PC bit 17) in UII memory bank 480 can be used to vary the default data system for packed objects 520*a-n*. A value of '0' confirms use of the default data system (e.g., AIs) and a value of '1' changes the default to a second data system (e.g., DIs).

In an embodiment, a value of the access method in either the first or second technique may be used to indicate a non-dictionary memory layout (e.g., the value '00'). Additionally, a value of the DSFID 510 in the first technique may be used to indicate that there is no data in user memory bank 460, that the memory is unformatted, or that the memory is formatted according to a closed-system standard. For example, a zero-value DSFID 510 may be used to indicate that there is no data in user memory bank 460.

In a final technique, DSFID 510 may be omitted from user memory bank 460. In this technique, the value of the application format identifier (AFI) bit (e.g., PC bit 17) in UII memory bank 480 is used to indicate that the tag uses packed objects. In this technique, a default data system is defined for user memory bank 460. For example, the default data system may be set to AI. The ID value in the first position is then used to confirm the default or to change the default data system. For example, the AI Header record for the first ID value may be a shift entry used to indicate a shift to a different default data system (e.g., DI or TEI).

Because the DSFID 510 may also be used to signal the presence of additional information in user memory, special flags are defined for use with the final technique. For example, the appearance of a predefined bit pattern (e.g., '100') is used to signal the presence of a special features section 550. The presence of this optional special features section 550 is signaled by using an otherwise-invalid pattern in the initial 3 bits of the packed object 520. In a further example, the appearance of a predefined bit pattern in the first six bits of a packed object is used to signal the presence of an optional external directory 580 (as distinct from the "mini-directory" 535 that is inherently part of every packed object 520). The presence of this optional external directory 580 is signaled by the presence of a predefined bit pattern at a predefined memory location. For example, the optional external directory may be signaled by using an otherwise-invalid pattern in the initial 6 bits of what would be the first packed object 520*a*.

Various embodiments of the present invention may use different DSFID formats. For example, an embodiment may use a DSFID which favors AIs, allowing DIs to be encoded at a lower efficiency. In another exemplary embodiment, a DSFID can be used which favors DIs, allowing AIs to be encoded at a lower efficiency. In a further example, an embodiment may use a DSFID in which all AIs and DIs use the same compaction and general structure.

2.2 Packed Objects

The structure of a packed object 520 explicitly encodes the size (in bytes) of packed object, allowing for speedier sequential access. In addition, the structure provides the option for storing multiple data items, including items from different data systems, within one packed object 520. This storage format minimizes the bit-overhead entailed in encoding each distinct packed object 520, and allows the data content from multiple data elements to be concatenated before compacting, preventing wasted pad bits at the end of each data item. Furthermore, the packed object 520 structure described herein provides a degree of random access, without incurring the bit-overhead of adding a full Directory section as does the ISO Directory method. This is achieved by grouping all the Header ID index values for a given packed object 520 at the front of the packed object 520, creating a "mini-directory" 535 for each packed object 520. Unlike the ISO Directory method, in the packed object format, there is no need to repeat the ID values in two different areas of the tag memory.

As illustrated in FIG. 5, a packed object includes a length section 525, an identifier section 530, an optional auxiliary identifier (Aux ID) section 540, an optional special features section 550, and a data section 560. In an embodiment, the sections of packet object 520 are bit-aligned (that is, no pad bits between sections are required). One or more sections of a packet object 520 may have a variable number of bytes.

Length section 525 indicates the overall length of the packet and indicates how many identifier values (e.g., AIs) are encoded in the packet. Length section 525 is described in further detail in Section 2.2.1 below. Identifier (ID) section 530 includes a listing of one or more IDs. ID section 530 is described in further detail in Section 2.2.2 below. Aux ID section 540, when present, encodes additional bits that are defined for some classes of IDs. These bits aid data compression but do not contribute to defining the ID. Aux ID section 540 is described in further detail in section 2.2.3 below. Data section 560 represents the concatenated and compressed data from the AIs and other IDs. Data section 560 is described in further detail in section 2.2.4 below.

It is to be noted that although the format for packed objects 520*a-n* of this proposal cannot be parsed using the current rules of the ISO/IEC 15961 and 15962 standards, this is not a critical concern, because the current versions of these standards do not include support for addressing multiple memory banks on a tag.

2.2.1 Length Section

Figure 6:
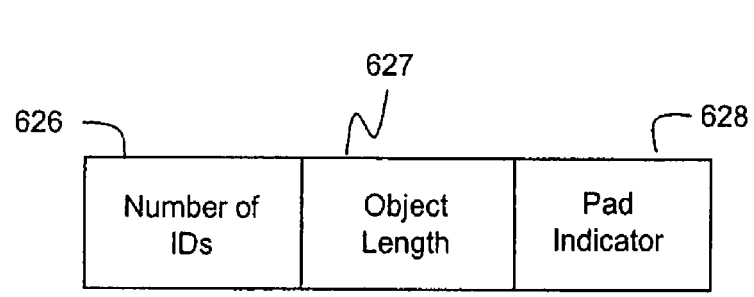
FIG. 6 depicts an exemplary length section, according to embodiments of the present invention.

FIG. 6 depicts an exemplary length section 525, according to embodiments of the present invention. Length section 525 includes two length vectors (number of IDs field 626 and object length field 627) and a flag (pad indicator 628). Number of IDs field 626 indicates the number of ID values in the packed object 520. In an embodiment, one is added to the value in the number of IDs field 626 to obtain the total number of ID values. Number of IDs field 626 may be a variable 3-bit extensible bit vector (EBV-3). The EBV-3 is a data structure having an array of one or more 3-bit blocks. Each 3-bit block has an extension bit and 2 data bits. To support a terminating pattern of all zeros (described below), the meanings of a three-bit EBV-3 may be reversed. The use of EBV-3 is a design tradeoff to minimize the overhead of supporting a given feature in a tag that is severely memory limited while supporting that feature, at worse than minimal overhead, in a larger tag that can better "afford" the overhead. In the case of conveying the number of IDs field, the EBV-3 favors small (less than 5 ID) objects that will naturally be found on smaller tags. Very large ID numbers will be inefficiently expressed but will likely occur within relatively large tag memories.

In an embodiment, the current EBV-3 definition is retained for all multi-part EBV (for numbers>4). However, in this embodiment, the lowest four values (in a single-part EBV-3) are arbitrarily redefined in the reversed format described above. That is, '000' may indicate that four values are encoded in the packed object; '001' may indicate that three values are encoded in the packed object; '010' may indicate that two values are encoded in the packed object; and '011' indicates that one ID value is encoded in the object. For example, an EBV-3 of '101 000' indicates 5 total ID values, as before.

The object length field 627 indicates the number of bytes in the packed object 520 including the first byte of this section but excluding any alignment blocks after the packed object 520. In an embodiment, one is added to the value in the object length field to obtain the total number of bytes. Object length field 627 may be a variable 6-bit EBV (EBV-6). The EBV-6 is a data structure having an array of one or more 6-bit blocks, each having an extension bit and 5 data bits. For example, an EBV-6 of '000010' (value of 2) indicates a three-byte packed object 520; an EBV-6 of '100001 00000' (value of 32) indicates a 33-byte packet object.

Pad indicator bit 628 indicates whether any pad bits are present in the last data byte. The pad indicator bit 628 follows the end of the object length field 627. The pad indicator bit 628 is set to a first value (e.g., '0') if there are no padding bits in the last data byte of the packed object 520. The pad indicator bit is set to a second value (e.g., '1') if pad-bits are present in the last data byte. For example, if set to the second value (e.g., '1'), bitwise padding begins with the least-significant or rightmost '1' bit of the last data byte, and the padding consists of this '1' bit, plus any '0' bits to the right of that bit. This method of padding effectively uses a single bit to indicate a three-bit quantity (i.e., the number of trailing pad bits).

A reader may want to determine the total number of bits (rather than bytes) in the packed object 520 during a decode operation. In this scenario, the reader would examine the length section of 525 packed object 520, add one to the EBV-6 value (to determine the number of bytes) and multiply the result by eight, and (if the Pad Indicator bit 628 is set) examine the last byte of packed object 520 and decrement the bit count by 1 plus the number of '0' bits following the rightmost '1' bit of that final byte.

2.2.1.1 Implied Packed Object Length

Under certain circumstances portions of length section 525 may be omitted to reduce the number of bits transmitted. When a small number of IDs are encoded (e.g., only one ID encoded), the length of the packed object 520 can be implied from the ID value. For example, if the number of IDs field indicates that only one ID is encoded (e.g., EBV-3 bits are '011'), then the normal ordering of sections within the packed object 520 is changed in order to save bits. In this scenario, the single ID value immediately follows the number of IDs field (e.g., the '011' EBV-3 pattern). Furthermore, if the single ID value indicates one or two all-numeric data items (and thus, no alphanumeric (A/N) subsection is present), then the remainder of a standard the length section 525 is omitted (e.g., the object length field 627 and the pad indicator bit 628 are omitted, thus saving seven bits). If instead the ID value indicates an A/N data item, then the remaining bits of length section 525 are not omitted, and instead immediately follow the ID value. The encoding format proceeds normally from that point. In addition, the ID value or object length field may be followed by a character map length indicator. For example, the character map length indicator may be formatted as EBV-6. The normal data section 560 follows the character map length indicator (which in this case will begin with a standard A/N header). In the case of A/N data, this mechanism only saves one bit (the Pad Present bit), and at the expense of even more complexity when parsing past an "uninteresting" packed object 520.

Omitting the object length field 627 under the above circumstances is possible because the packed object's data item(s) are by definition either fixed-length numeric (known directly from the table), variable-length numeric (and the length is encoded in the Aux ID section 540 which in this scenario immediately follows), or handled using Custom Compaction (in which case the encoded length is known a priori). In all of these cases, little or no further parsing is required to determine the complete packed object 520 length, and so it need not be explicitly encoded. The above format rule can be used to save six bits in very small packed objects (e.g., those containing just a single ID value such as an SSCC18).

There is a theoretical drawback to this implied object length option. Normally, if a Reader determines that none of the ID values match a target of interest, the reader can skip the remainder of packed object 520 without any analysis of the ID values or any of the object's bits that follow the ID values. However, invoking this option forces the Reader to analyze the "uninteresting" ID value, and possibly read a subsequent run length, in order to skip to the next packed object.

If the lowest four values of the number of IDs are not encoded in reverse, then for a low-valued ID, the above exception format could create a leading byte of all zeros which is currently used as a memory terminator flag pattern. As discussed above, one solution is to redefine the number of IDs field (e.g., EBV-3) such that a single ID is not indicated by '000.' Alternatively, the memory terminator pattern could be redefined as '10010000' (an Object Pad with trailing bits of '00', which can easily be prohibited when the pattern is meant to indicate a Pad). However, this alternative loses the attractive feature of an all-zero memory terminator pattern. Zero is likely to be the default value of unwritten memory.

2.2.1.2 Packed Object End Pattern

Eight successive '0' bits at the expected start of a packed object 520 can be used to denote that no more packed objects 520 are present in the remaining bytes of user memory bank 460 or to indicate the end of user data in user memory bank 460. Under normal circumstances, eight successive '0' bits at the expected start of a packed object 520 would indicate that the packed object 520 contains four ID values having an overall length less than three bytes. This scenario is not possible given the above defined packed object 520 format. Note further that there is no need to examine the second byte in order to determine that the first all-zero byte of the supposed packed object's length section 525 is invalid. Thus, a byte whose value is zero at the expected start of a packed object 520 can be used as a data terminating flag pattern.

2.2.1.3 Special Features and External Directory Flags

The appearance of predefined bit pattern (e.g., '100') at the start of a packed object 520, if immediately followed by a valid bit pattern (e.g., a valid EBV-3), may be used as a "Features Flag" to indicate that an optional "Special Features Section" is encoded immediately preceding data section 560. Under normal circumstances, an EBV-3 starting with '100' is redundant and therefore invalid (for example, '100 011' is equivalent to the shorter '011').

An EBV-3 starting with '100100' (e.g., in the number of IDs field) does not fit the format of the Special Features flag, but is similarly redundant and therefore invalid. (for example, '100 011' is equivalent to the shorter '011'). Thus, the appearance of '100100' at the expected start of a packed object 520 may be used to indicate one of two conditions. First, if the pattern is used prior to first packed object 520*a* of the user memory bank 460, the pattern indicates the presence of an optional External Directory 580 (as distinct from the inherent mini-directory 535 within each packed object 520). Second, if the pattern is used after the end of packed object 520, this pattern serves as padding, so that the next packed object 520 may begin on a word boundary.

2.2.2 Identifier (ID) Section

Figure 7:
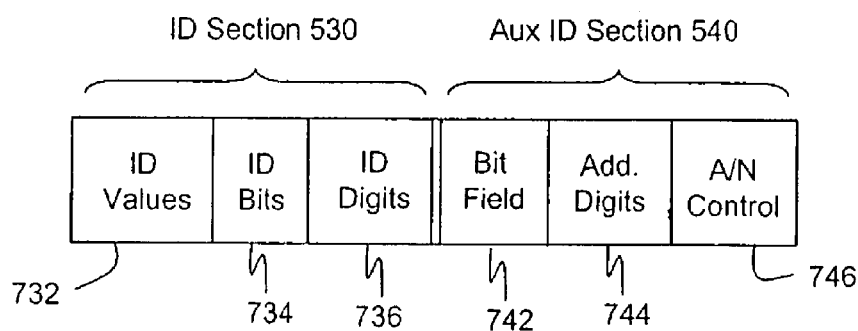
FIG. 7 depicts an exemplary ID section, according to embodiments of the present invention.

FIG. 7 depicts an exemplary ID section 530, according to embodiments of the present invention. Each packed object 520 may encode one or more data elements (AI strings, DI strings, etc). The ID section 530 encodes a complete listing of all the identifiers (AIs, DIs, etc) encoded in a packed object 520. To conserve tag bits, each identifier is typically represented as an index, representing an entry into a table of identifier values (referred to herein as "ID header tables"). The ID header table entries define the data system identifiers (e.g., AI or DI) represented by the ID index values. In an embodiment, the identifier index is a byte. As is well known in the art, data system identifiers are used to carry information about a particular scenario in which an RFID tag might be used. For example, in the case of a warehouse, the identifier strings may carry information about an item relating to its Date of Manufacture, Country of Origin and so on.

2.2.2.1 ID Header Table

One or more ID header tables may be used in the present invention. Each data system supported may have one or more associated ID header tables. For example, one or more ID header tables may be defined for AI values and one or more header tables may be defined for DI values. Alternatively, an AI ID header table may include one or more values indicating a shift to a different data system (e.g., DI).

The ID Header table index for an identifier is a compressed representation of the identifier. A Header Table Index typically defines an identifier or a commonly-utilized pair or set of identifiers. However, in some cases, additional bits or digits are required to fully define an identifier, and additional bits are always required to define a non-default ID (such as a DI, if AI's are the current default). Any such additional bits and digits are encoded if needed in subsections immediately following the last of the header indices. This minimizes the number of bits that must be read in order to fully determine the list of IDs in a packed object 520.

An index may compress a data element identifier to eight bits, or even four bits, for common pairings. For example, the AI for Net Volume (oz), "357n," is represented in the AI Header table as "43." In addition, for an index record, the table may provide additional information for the identifier such as whether the data element is always all-numeric and if all-numeric, the predefined fixed number of digits and/or fixed-length set of bits defining a variable range of data digits for the identifier. The ability to access this type of information a priori improves the efficiency of decoder.

In addition, an ID Header table may group a range of related identifiers under the same table index. For example, a range of identifiers associated with "length" may be grouped together under the same table index. The use of a single identifier to represent a range of related identifiers (or identifiers associated with the same search criteria) increases the efficiency of searching a population of tags for desired data. In this way, a matching tag can be identified using a minimum amount of information from the tag. For example, GS 1 defines thirty "Length" AIs (in the range 3210 through 3239), that differ from each other only in (a) the units of measure and (b) the number of decimal places in the measurement. An application program, seeking a "Length" data item in a mixed population of tags from different sources, would have no a priori knowledge of which of these 30 variants a given tag would employ, and thus the search criterion would have to treat all 30 on an equal footing. In an exemplary ID Header table, these 30 variants are grouped under the same index. Therefore, an application's search criterion need only search for the single index.

FIGS. 8A-E depicts a series of AI header tables, according to embodiments of the present invention. In the AI header tables of FIGS. 8A-E, each AI or DI identifier (which is either two, three, or four characters) is typically represented as an index, representing an entry in one of the tables in FIGS.

8A-E. These table entries define the AI(s) represented by the ID index value. In addition, for all-numeric AI's, the tables also indicate fixed-length and/or variable-length information, for improved compaction efficiency. Additional bits are sometimes required to fully define an ID; these are encoded in trailing subsections of ID section 530. The table entries may also include an indication of whether information is encoded in the Aux ID section 540. In an embodiment, an ID Header table (e.g., each ID Header table shown in FIGS. 8A-E) includes an extra column indicating whether a given AI's data ends in a Check Character that can be stripped before encoding, and correspondingly calculated and appended to the decoded data by the Reader.

Base Table of AI ID values 810 includes a set of AI values defined by standards or industry organization (e.g., GS1) or common pairings of such AIs. For example, most AI values less than or equal to 127 have been defined. Details of Trade and Logistics assignments are given in a second table 820. In some cases, only the first two or three digits of a series of related four-digit AIs are fully indicated by the ID value and in these cases the third/fourth AI digits are encoded in the ID Bits field 734 and ID Digits 736 field (described below in Section 2.2.2) following the list of index values. However, the Base Table has been designed such that an index value alone is always sufficient for the purpose of searching for a specific GS1-defined data attribute (such as "Length or first dimension, logistics").

For the already-assigned 4-digit Trade and Logistics AIs shown in FIGS. 8A-E, the fourth digit is always a decimal point locator (which would not be used to search for a particular AI's). In some cases, two or three AIs in this table are grouped at the third digit, if that digit only distinguishes between the unit of measure in use for the same logical quantity. Tables of FIGS. 8A-E also define custom compactions like dates, fixed lengths, and range for variable length all numeric AIs for further data encoding efficiencies.

For example, many AIs use the fourth digit for an implied decimal point, which should never be part of a search criterion and the fourth AI digit may be instead encoded in Aux ID section 540. Another example which relates to logistics lengths, whether in inches (AI 321n), feet (AI 322n) or yards (AI 323n) classes together two Aux ID values.

The Base Table also indicates, for all-numeric data strings, how many fixed data digits should be assumed when decoding the compressed data, and/or how many bits have been encoded (within Aux ID section 540, as will be described below) to indicate the number of variable data digits present in this specific instance of the data string.

Some entries in the base Header table correspond to common pairings of AI's. When the decoder encounters such a value of any of ID values, it behaves as if the two AIs had been indicated by a sequence of two of such values of ID values that indicate each of such two AIs individually.

The "Extended Table of ID values" illustrated in FIGS. 8A-E includes a set of ID values reserved to characterize AIs that have not been defined by a standards or industry organization. So that this table will not need updating over time, the table lists characteristics of AI's (such as whether the AI consists of 2, 3, or 4 digits, whether it is all-numeric, of fixed length or a variable range, etc), rather than full AI numbers. This table is designed so that a decoder can determine, from an encoded ID value, how many AI digits are encoded within the Aux ID section 540, for fixed-length all-numeric AIs, an indication of how many data digits are encoded within the data section 560; for variable-length all-numeric AI's, an indication of how many length bits are encoded in the Aux ID section 540, which in turn indicate the number of data digits encoded within data section 560.

One or more Base ID values may be used to indicate that a DI is encoded within the current packed object 520. These values indicate that the corresponding DI is encoded, within the Aux ID subsection, in either 8 or 16 bits respectively, using the algorithm defined in ISO/IEC 15961. This method of representing DIs may be superseded by more efficiently indexing into a DI Header Table.

Given that the above embodiments set a default data system for all the packed objects 520*a*-*n* in a given user memory bank 460, a standardized "data system shift" mechanism, common to all supported data systems, is desirable. For example, a standards Shift pattern of eight '1's could be defined as a shift, immediately followed by the EBV-3 representation (as defined above for the start of the bank) of the chosen data system. Every defined data system Table could reserve its final (all-'1's) index value for this purpose. If a particular Table uses fewer than eight bits for its indexes, then extra one bits would be appended to reach a total of eight. Alternately, if the table is large and requires more than eight bits for each index, then the final range of values (those starting with eight '1's) would be reserved for the Shift. As previously disclosed, if the first ID on the object's list is shifted, then this changes the default for the entire packed object 520.

2.2.2.2 ID Section Format

ID section 530 includes an ID values subsection 732, an ID bits subsection 734, and an ID digits subsection 736. The ID values subsection 732 includes one or more identifier indices (also referred to as "ID values" or "ID Byte values"). The ID values subsection 732 may contain any number of ID values indicating individual data system index identifiers or identifier pairings. An encoder may choose one identifier per packet or many (which constitutes a no cost optional directory for smaller tags).

In an embodiment, all of a packed object's index identifiers can be fully recognized without expanding the compressed data, even though some ID values provide only a partial identifier. As a result, the ID Section 530 may include a trailing ID Bits subsection 534 (if any of the ID values indicate an incomplete identifier). Examples include a two-bit field to identify the third digit of a group of related Logistics AIs. As a further example, one or more of the IDs on the initial list may serve as "Shifts" to a different data system (for example, some ID values within the AI Table illustrated in FIGS. 8A-E are assigned to "introduce" DIs). When these occur, the remaining bit fields required to complete the ID are defined in the Header table. All such bit fields are concatenated in this subsection, in the order called for by the initial ID list.

To ensure that all of a packed object's identifiers can be fully recognized without expanding the compressed data, an ID Digits section 536 may also be required. For example, AI table entries may assign a seven-bit number to define the characteristics of the AI, without defining the specific 2-, 3-, or 4-digit value. All such digits are concatenated, in the order called for by the initial ID list, and encoded in the ID Digits subsection as a single binary number.

2.2.2.3 Mini-Directory

The combination of length section 525 and identifier section 530 is referred to as "mini-directory" 535. Alternatively, identifier section 530 may be considered a "mini-directory" 535. Mini-directory 535 gives a Reader-Tag communication scenario a degree of random access, without incurring any bit-overhead of adding a full Directory section as does the ISO method. It does this by grouping all the Header ID values for a given packed object 520 at the front of the object, creating a "mini-directory" for each packed object 520. Unlike the ISO Directory method, there is no need to repeat the ID values in two different areas of the tag memory.

As a further improvement over the ISO Directory method, the "mini-directories" 535 of the exemplary user memory bank 460 format described herein waste no bits on providing explicit indexes or pointers to the data whose IDs (in the ISO method) are repeated in both the data portion and the directory portion of the tag memory.

2.2.2.4 Identifier Aliases

Certain identifiers are globally defined as alphanumeric. However, in certain industries, an identifier defined as alphanumeric may only be encoded as digits. In these cases, an identifier alias can be created in the Header table to indicate to an encoder and/or decoder than the identifier can be treated as a numeric instead of an alphanumeric. For example, Batch/Lot number AI 10 has been defined by GS1 as an alphanumeric. However, certain industries such as the Pharmaceutical industry only use numeric batch/lot numbers. Therefore, an alias header value can be added as a second entry for AI 10 (Batch/Lot number). This second entry still results in data that will be interpreted as a normal AI 10, but the encoded use of the "alias" header value tells the Encoder and Decoder that they can treat the data more efficiently as a variable-length Numeric (with a four bit length, for lot numbers of 5 through 20 digits). In the example illustrated in FIGS. 8A-E, a second entry is added for AI 17 coupled with the numeric version of AI 10. This encoding option, when the user's data content allows it, avoids the need for A/N encoding, saving the A/N Header bits. Furthermore, when the user's Lot is all-numeric, implied object length alternatives, described in Section 2.2.2.1, can be used for further savings.

2.2.3 Auxiliary Identifier (ID) Section

An entry in a header table, as part of its definition, can call for various types of auxiliary information (such as bit fields or decimal digits), beyond the complete indication of the ID itself, to aid the data compaction process. The various types of data elements are amenable to different encoding methods, resulting in one or more separately-compressed portions within Aux ID section 540, as called for by the specific IDs on the list.

FIG. 7 depicts an exemplary Auxiliary ID section 540, according to embodiments of the present invention. Auxiliary ID section 540 includes a bit field portion 742, an additional digit portion 744, and an optional A/N control portion 746. In an embodiment, when present, these portions are bit aligned, with no gaps.

An ID Header entry may call for additional bit fields in order to enable the decoder to parse the compressed-version of its data. Examples include a 3-, 4, or 5-bit field to encode the string length of a variable-length data element. All such bit fields are concatenated in the bit field portion 742, in the order called for by the initial ID list.

In the additional digits portion 744, any additional digits (as opposed to binary bit fields) called for by the IDs on the list (but not actually part of the IDs), in order to enable the decoder to parse the compressed version of its data, are concatenated into a single string of digits and encoded as a single binary value, using the minimum number of bits (as indicated by the Header table). The decoder, after processing the initial ID list, determines the number of Additional Digits, and therefore is able to correctly parse these digits from the binary value.

The ID list may contain one or more IDs indicating that the corresponding data strings consist of variable-length alphanumeric data. In many cases, the encoder will achieve best efficiency by concatenating these data strings and compressing them as a whole. In other cases, if at least two such A/N data strings are encoded in the same packed object 520, the encoder may choose to compress one or more of the A/N data strings independently. Thus, in any packed object 520 that contains more than one A/N ID, an A/N Control portion 746 is added, consisting of (at minimum) a single "Split A/N" bit. If zero or one A/N ID is present, the A/N control portion 746 may be omitted.

If the split A/N bit has a value of '0', the bit indicates that all of the remaining A/N data has been concatenated into one grouping (therefore preceded by a single A/N Header in the data section 560). That is, no (or no more) A/N headers are included in Aux ID section 540. If the split A/N bit has a value of '1,' this bit is immediately followed by the control information necessary to decode the next A/N ID on the list. The control information may include a CharMap length indicator (in EBV-6 form), all components of an A/N Header (as defined below), another "Split A/N" bit, indicating whether the next A/N ID on the ID list has been split, or is grouped with the remaining A/N data. If '1', this bit is immediately followed by another set of control information. Note that this bit is omitted when only one A/N ID remains on the packed object's list.

Note that, when a "split A/N" control field appears, the corresponding A/N Header information, for that data string, is not repeated again in data section 560. Only the A/N Header for the last A/N string(s), those not split from the final A/N grouping, appears within data section 560.

2.2.4 Special Features Section

Special features section 550 is configured to hold one or more data values (referred to as "feature flags") which define and/or control features specific to one or more packed objects or the user memory bank as a whole. As described above, a flag in length section 525 indicates the presence of the special features section. As illustrated in FIG. 5, when present, the special features section 550 follows Aux ID Section 540.

The format of the special features section 550 is dependent upon the needs of a specific implementation or application. In an embodiment, the set of flags and/or bit patterns are variable-length bit streams encoded in EBV-8 format. In this embodiment, the MSB in the last data set is set to '1' to indicate the end of the section. A decoder can then repeatedly parse sets of 8 bits until a set whose MSB is '1' is found. To maintain forward compatibility, any future bit definitions may utilize '0' values to preserve the syntax and semantics of packed objects 520 as defined herein.

One or more of the feature flags may control features that vary from packed object 520 to packed object 520. In addition, one or more of the feature flags may control features that are unlikely to vary between packed objects, or are totally independent of packed objects (such as a flag to indicate the presence of Sensor Data). In an embodiment, flags set to non-default values in the first packed object 520a of user memory bank 460 are considered global to the entire bank. Where logically consistent, these "global" flags can be changed for individual packed objects by adding special features sections to those packed objects 520. Thus, in a typical application, at most only the first packed object 520a of the bank will contain special features section 550.

In addition to the feature flags, special features section 550 includes an internal alignment flag. The internal alignment flag indicates the alignment or packing between data items within data section 560. In an embodiment, the internal alignment flag is the two least significant bits of special features section 550. A default internal alignment is defined for a packed object for situations in which the special features section 550 is not present. For example, the default internal alignment may be set to bit-alignment (i.e., the data is fully packed). The default may also be represented by a first value of the internal alignment flag (e.g., '00'). The default value of the bit-alignment for a packed object may be changed by setting the internal alignment flag to a different value. For example, a second value (e.g., '01') may indicate Byte alignment, a third value (e.g., '10') may indicate Word alignment, and a fourth value ('11') many indicate an extended alignment of the compressed data elements in data section 560. If so indicated, an encoder inserts '0' bits as necessary to begin each ID's compressed data at the specified alignment boundary. The internal alignment flags do not apply to multiple data items which are encoded within a single alphanumeric section at the end of data section 560, as described below in Section 2.2.5 below.

2.2.5 Data Section

Data Section 560 contains the compacted contents of each identifier data string (e.g., AI or DI data strings). Depending on the characteristics of the encoded IDs and data strings, data section 560 may include up to three subsections. The subsections of data section 560 may be bit-aligned (i.e., no pad bits needed between subsections). However, an alternative alignment may be specified in optional special features section 550 (described above). FIG. 9 depicts an exemplary data section 560, according to embodiments of the present invention. Data section 560 may include a custom-compaction subsection 962, a known-length-numerics subsection 964, and an alphanumerics (A/N) subsection 966.

Custom-compaction subsection 962 includes identifier data strings encoded using a customized compaction method. For example, the header table may indicate a customized compaction method was used to encode a particular identifier. In an embodiment, a custom method is defined for six-digit date fields (e.g., AI's 11 through 17). This custom method encodes a six-digit date into sixteen bits. For example, the custom method may use the definition in the specification for the EAN.UCC Composite Symbology. For example, after parsing off all of the bits in the Aux ID section 540, a decoder parses off any bit patterns corresponding to identifiers whose table entry indicated a custom compaction method. The expanded ASCII data may be saved, and inserted into the proper position of the output data stream at the end of the decoding process.

The known-length-numerics subsection 564 includes numeric identifier strings which have a known length. As described above, for always-numeric identifier data strings, the ID header table may indicate a fixed number of digits and/or a variable-length number of bits for the particular identifier data string. The fixed number of digits is not encoded in packed object 520. The length of the variable-length number of bits is encoded in the Aux ID bit field subsection 542.

The summation of any fixed-length-digits information derived directly from the ID header table plus any variable-length-digits information derived from the encoded bits as just described results in a "known-length entry" for each of the always-numeric identifier list entries encoded in the current packed object 520. The numeric data for each such identifier data string in a packed object may be encoded by converting the digit string into a single binary number (up to 160 bits, representing a binary value between 0 and $1*10^{48}$). FIG. 13 shows the number of bits required to represent a given number of digits. In all cases, a limit is placed on the size of a single input group, selected so as to output a group no larger than 25 bytes, with no pad bits required. For example, if an all-numeric string contains more than 48 digits, the first 48 are encoded as one 20-byte group, followed by the next group of up to 48 digits, and so on. Finally, the binary values for each all-numeric data string in the packed object 520 are themselves concatenated to form the Known-length-Numerics subsection 964.

Since the individual data items are typically much shorter than 48 digits, the size of any single base conversion operation may be limited to a smaller number of digits, with very little loss of efficiency. For example, instead of a maximum of 48, the maximum grouping can be defined as 24 digits (10 bytes), and a longer string of digits is then encoded in bit-aligned groups of 24, except for the last group which could be smaller. This same approach could be used with the various base conversions in the Alphanumeric subsection 966.

Alphanumeric (A/N) subsection 966, if present, encodes any identifier data strings that were not already encoded in either custom-compaction section 962 or known-length-numerics subsections 964. Alphanumeric subsection 966 can encode any mix of digits and non-digit characters (e.g., ASCII characters). The first (most significant) bit of A/N subsection, if present, immediately follows the least-significant bit of the preceding data-carrying subsection if any (i.e., if at least one of the custom-compaction 962 and/or known-length-numerics subsections 964 needed to be encoded). If no prior data-carrying subsections were encoded, then A/N subsection 966 by definition contains all of the packed object's 520 data, and must be present. In this case (where neither the custom-compaction subsection 962 nor the known-length-numerics subsection 964 was encoded), the first bit of alphanumeric subsection 966 follows the least-significant bit of the Aux ID subsection 540 (if present), or follows the least-significant bit of the ID Section 530 otherwise.

Characters in A/N subsection 966 can be encoded using a variety of mechanisms. For example, digits can be encoded using Base 10 and non-digit characters using Base 30, Base 74, or Base 118. FIG. 13 depicts the number of bits required to encode various numbers of Base 10, Base 30, Base 74, and Base 118 values. In all cases, a limit is placed on the size of a single input group, selected so as to output a group no larger than 25 bytes, with no pad bits required. Base 10 encodes digits '0' through '9' as values 0 through 9, respectively.

Base 30 encodes capital letters and the space character in one Base-30 value and encodes the remainder of the ASCII character set in two base-30 values, except for the digits and the DEL character (ASCII value 127) which cannot be encoded using Base 30 encodation. FIG. 11 illustrates the Base 30 character set. In Base 30, the uppercase letters are optimized. In an alternate embodiment, one or more of the "control" characters in the Base 30 shift1 set are replaced with digits. One purpose of the replacement is to prevent a potentially long non-numeric run from being "ruined" by one or two intervening digits. In this embodiment, the first ten values in Shift 1 are redefined to represent single digits. Additionally, the next ten Shift1 values could also indicate a digit, but where the following Base 30 value would also represent a digit, and so on for the third ten Shift1 values. Such a mechanism might rarely pay off, but it would cost nothing (except the loss of access to some or all Control characters from Base 30).

Mixed non-numerics include both uppercase and lowercase alphanumerics and other ASCII characters. This character sets are typically encoded using a larger "mixed non-numerics" set such as Base 74 or Base 118. When A/N subsection 966 encodes AI data elements exclusively, the mixed non-numerics set (Base 74) contains 74 members having only those ASCII characters specified for use within an AI (including most punctuation characters but excluding digits and non-printable characters) and FNC1 and space. FIGS. 12A-B illustrates the Base 74 character set. For situations where a high percentage of the input data's non-numeric characters would require pairs of base-30 values, base 118 encoding may be used. The values in the base 118 encoding set correspond to seven-bit ASCII values and character assignments, except that characters '0' through '9' (ASCII values 48 through 57) are not supported. Therefore, base 118 encoding subtracts 10 from the standard ASCII values for all ASCII characters whose standard value is greater than 57. Base 118 set also includes FNC1 and all non-numeric ASCII characters. All characters from either of theses "mixed non-numerics" sets (except "delete") are also accessible from Base 30 via the use of an extra "shift" value. Depending on the relative percentage of "native" Base 30 values versus other values in the data string, one of those bases is selected as the more efficient choice for a non-numeric base.

Base 74 is more efficient than Base 118 because it favors only the subset of ASCII that is allowed in GS1 data. Moreover, the general data format of user data bank 460 makes the choice of Base 74 (instead of Base 118) automatic for GS1 data. The encoding scheme, as described herein, uses different-sized character sets depending on the data system.

Note that "space" is not part of the defined GS1 character set. Therefore, within GS1-defined data elements, value 0 from the table illustrated in FIG. 11 represents FNC1 instead of space (and is used to separate variable-length data items).

FIG. 10 depicts an exemplary A/N subsection 966, according to embodiments of the present invention. A/N subsection 966 when present includes an A/N header 1071 and one or two Base 256 values 1078, 1079. The digits to be encoded in the A/N subsection are concatenated into a first string and the non-numeric characters to be encoded in A/N subsection 966 are concatenated into a second string, including representations of trailing FNC1 characters where needed. The first Base 256 value, Base 10 value 1078, includes the first string of concatenated digits converted from Base 10. The second Base 256 value, Base A value 1079, includes the second string of concatenated non-digit characters converted from the non-numeric base. The use of concatenation and character classification (as described further below) significantly increases performance of encoding and decoding operations. For example, digit characters within the data are encoded at an average efficiency of 4.322 bits per digit or better, depending on the character sequence. The non-digit characters are independently encoded at an average efficiency that varies between 5.91 bits per character or better (all uppercase letters), to a worst-case limit of just under 8 bits per character (if mixed Full ASCII).

A/N header 1071 includes a Base A select bit 1072, a mixed non-numerics control bit 1073, a prefix field 1074, an infix field 1075, a suffix field 1076, and a character map 1077. Base A select bit 1072 provides a high-level indication of the non-digit base used for encoding the non-numeric characters. For example, Base A select bit 1072 indicates whether Base 30 encoding or one of the supported "mixed non-numeric" encoding sets (e.g., Base 74 or Base 118) was used. Control bit 1073 indicates which of the "mixed non-numeric" encoding sets was used. Control bit 1073 is optional. Control bit 1073 is typically present when A/N subsection 966 includes non-AI data elements.

Character map 1077 indicates the precise sequence of numeric and non-numeric characters in the data encoded in the A/N subsection. In general, each character in a data string is represented by one (or possible two) bits in character map 1077. Character map 1077 is a variable-length bit pattern where each '0' represents a digit and each '1' represents a non-numeric character (in the selected base). Note that, if Base 30 encoding was selected, each data character (other than uppercase letters and the space character) needs to be represented by a pair of base-30 values, and thus each such data character is represented by a pair of '1' bits in the character map. For example, data string "1A23B456c" would be represented by the character map "0100100011."

Prefix field 1074, infix field 1075, and suffix field 1076 provide a method for compressing character map 1077. In an embodiment, a run-length representation can be defined for specific characters from the same base. For example, where the data string includes runs of five or more character values from the same base, the run-length can be represented in either the prefix field 1074, infix field 1075, or suffix field 1076 depending on its location within the data string. Thus, the prefix field 1074, infix field 1075, and suffix field 1076 can replace the first, central, and/or last bit pattern portions of character map 1077. As would be appreciated by persons of skill in the art, any length can be used as the run-length.

Prefix field 1074 includes a prefix present bit 1074a, a base identification bit 1074b, and length 1074c. Prefix present bit 1074a indicates whether a character map prefix is encoded. For example, a '0' value indicates that no character map prefix is encoded. In this case, base identification bit 1074b and length 1074c would not be included in prefix field 1074. A '1' value indicates that a character map prefix is encoded. Base identification bit 1074b indicates whether a sequence of numeric base values (e.g., base 10) or a sequence of non-numeric base values is present. For example, a '0' value may indicate a sequence of base 10 values is present in A/N subsection 966 and a '1' value may indicate that a sequence of base 30, 74, or 118 values is present. Length 1074c indicates the length of the run. Length may be represented by any number of bits. As discussed herein, length may be described as 3-bits. In an embodiment, length 1074c assumes a minimum useable run of five same-base characters. In an embodiment, the length value for the run is divided by 2. Thus, possible 3-bit length values of 0, 1, 2, . . . 7 indicate a sequence of 5, 7, 9, . . . 19 characters from the same base. When used, the base identification bit and length sequence (e.g., 4 bits) can replace up to 19 same-base bits of the character map. If the length run is an even number, the trailing "even" character at the end of the run is represented by adding a bit to character map 1077.

Infix field 1075 includes a infix present bit 1075a, a base identification bit 1075b, an offset 1075c, and a length 1075d. Infix present bit 1075a indicates whether a character map infix is encoded. For example, a '0' value indicates that no character map infix is encoded. In this case, the remaining subsections of infix field 1075 would not be included. Base identification bit 1075b indicates whether a sequence of numeric base values (e.g., base 10) or a sequence of non-numeric base values is present. Offset 1075c represents the offset (e.g., 0, 2, 4, 6, . . . 14 characters) from the end of Prefix bit(s) 612 or from the start of the data string, if no Prefix bit(s) 612 is defined. Length 1075d indicates the length of the run. Length may be represented by any number of bits. As discussed herein, length may be described as 3-bits. If the length run is an even number, the trailing "even" character at the end of the run is represented by adding a bit to character map 1077.

Suffix field 1076 includes a suffix present bit 1076a, a base identification bit 1074b, and length 1074c. Suffix present bit 1076a indicates whether a character map suffix is encoded. For example, a '0' value indicates that no character map suffix is encoded. In this case, base identification bit 1076*b* and length 1076*c* would not be included in suffix field 1076. Base identification bit 1076*b* indicates whether a sequence of numeric base values (e.g., base 10) or a sequence of non-numeric base values is present. For example, a '0' value may indicate a sequence of base 10 values is present in A/N subsection 966 and a '1' value may indicate that a sequence of base 30, 74, or 118 values is present. Length 1076*c* indicates the length of the run. Length may be represented by any number of bits. As discussed herein, length may be described as 3-bits. If the length run is an even number, the trailing "even" character at the end of the run is represented by adding a bit to character map 1077.

Character map 1077 is a variable-length bit pattern. When prefix 1074, infix 1075, and/or suffix 1076 are present, character map 1077 represents the base of each of the data characters, if any, that were not accounted for by prefix 1074, infix 1075, and/or suffix 1076.

Base 10 value 1078 follows the last bit of character map 1077. Base 10 value 1078 is a base-10 bit sequence that directly represents the binary number resulting from encoding the sequence of the digits (ignoring any intervening non-digit characters) as a single value, or in other words, applying a base 10 to base 256 conversion. The number of bits to encode this sequence is directly determined from the number of digits being represented. Base-10 value 1078 may be absent entirely; if character map 1077 indicates that no digits are in the data sequence.

Base A value 1079 follows the last bit of the base-10 bit sequence (if any), shown by Base 10 value 1078. Base A value 1079 is a non-numeric (Base 30, Base 74, or Base 118) bit sequence representing the binary number resulting from a base-30 to base-256 conversion (or Base-74 or -118 to base-256 conversion) of the sequence of non-digit characters in the data (ignoring any intervening digits). Again, the number of encoded bits is directly determined from the number of non-numeric values being represented. Base-A value 1079 may be absent entirely, if the character map indicates that no non-numeric characters are in the data sequence.

The last (least-significant) bit of the final base 256 bit pattern (e.g., Base 10 value 1078 or Base A value 1079) is also the last significant bit of the packed object 520. If there are any remaining bit positions in the last byte to be filled with pad bits, then the most significant pad bit shall be set to '1', and any remaining less-significant pad bits shall be set to '0.'

2.3 External Directory

A variety of alternatives can be used in the present invention for encoding optional external directory 580, involving differing trade-offs between encoding efficiency versus append efficiency versus random-access reading efficiency. As described above, the presence of an external directory 580 is indicated by predefined indicator pattern. For example, the predefined pattern may be a bit-pattern which would be invalid if used in a packed object (e.g., the six-bit indicator pattern of '100100'). Therefore, the invalid bit pattern can be used to indicate the presence of an external directory. In an embodiment, one or more bit flags are included which indicate the optional levels of external directory 580 support. These bits can immediately follow the indicator pattern but at least some of them could instead preface the actual data bits of optional external directory 580 (which may be located at the front of user memory bank 460, at the end of the series of packed objects 520*a-n*, or at the end of the user memory bank 460). The various levels and options of external directory 580 support are described below.

2.3.1 Minimal External Directory Option

In the minimal external directory option, external directory 580 provides some data to help a reader more efficiently navigate through a user memory bank 460 containing an unknown number of packed objects 520*a-n*. In this embodiment, external directory 580 includes an index to the first empty word of user memory bank 460.

When appending new data, the Index provides knowledge of where the new data can be written. When reading existing data, the Index alone is sufficient to relieve the Reader of the necessity of executing a final Read operation past the end of the last packed object 520 (simply to find out that no more packed objects are present). Furthermore, the index can help eliminate several extra read/response cycles when parsing a series of short packed objects. By using the index, at some point, the Reader can calculate that it would save time to read all of the remaining valid data at once, rather than to continue reading one packed object at a time.

Since the maximum required size (in bits) of this Index is completely determined by the total size of the memory bank, this Index can be initially written at a size that will never need to be expanded. As a result, the Index can beneficially be placed in memory before the first packed object 520*a*, with assurance that existing data will never have to be moved in order to make room for a larger "directory" as more data items are added in the future. Front-loading this information has some advantages over the approach of "tail-loading" the Directory, as used by ISO standards. First, based on a priori knowledge and/or statistics, a Reader can execute a single read that has a high probability of capturing both the data and the directory, without wasting the dead air time that a single dual-purpose read inevitably incurs under the "tail-loading" method. Also, front-loading allows the Reader, following its first short read of the bank, to fine-tune its optimization strategy based on the Index information.

As discussed above, a front-loaded Index is of stable length to avoid the need to relocate existing data before new data can be appended. For example, the length is fixed at the minimum length necessary to address any point in the user memory bank 460. The length of this Index may be self-identifying so that a Reader can quickly parse this Index in a population of tags with different memory bank sizes. The index therefore may either include a length prefix of a predetermined length or format or use an Extensible Bit Vector of a predetermined type such as EBV-5, or a similar approach.

For example, the Index-Length indicator could be defined as a minimum of three bits, where '000', '001', . . . '110' indicate an Index length ranging between four and ten bits, used for bank sizes of 4 words, 5 words, . . . 10 words, respectively. In addition, if vendors are offering memory sizes in increments of at least 32 bits, then these indicators could be defined to count double-words rather than bytes. The next largest set of length indicators would range from '111000' through '111110', and so on. Although this approach to length indication is increasingly wasteful as user memory bank 460 size grows, the indicator remains a negligible fraction of bank size.

If the index size is precisely sized to the size of user memory bank 460 as just described, then this Index not only indicates how much user data has been written, but also indicates the overall size of the user memory bank 460. This knowledge may relieve the Reader of the need to read and interpret the tag's TID to establish bank size. In addition, the information available in the index immediately tells a reader how much room remains for further appended data and also indicates the precise starting address of a tail-loaded directory (if the flag bits indicate one is present).

2.3.2 Medium-Support External Directory Option

In the medium-support external directory option, external directory 580 provides a full listing of all the IDs contained in all packed objects 520*a-b* in user memory bank 460, accompanied by only the minimum information necessary to find an ID of interest. At a minimum, this would require, as the directory entry for each packed object 520*a-n*, an indication of the number of ID values in that packed object 520 (e.g., in EBV-3 format), followed by an exact copy of the ID section of that packed object 520. This level of information is sufficient to allow the Reader to determine that a particular ID is in the 'nth' packed object. The reader would then navigate past the first (n−1) Packed Objects, needing only each packed object's length section 525 for navigation. It would then more thoroughly parse the nth packed object in order to retrieve the desired data.

2.3.3 High-Support External Directory Option

In the high-support external directory option, in addition to the exact copy of the ID section of the packed object, each packed object's entry would include a complete copy of its length section 525 (instead of just it's EBV-3), indicating the full size of packed object 520. This simple modification to the medium-support directory entry structure brings it nearly to true Random Access, at reasonable incremental bit cost. In this way, once a Reader established the presence of the target ID, it could immediately calculate the starting address of the relevant packed object 520, with no need to first navigate through the preceding packed objects. Furthermore, by using the total length (in bits) of the relevant packed object's 520 directory entry, the reader can calculate the start of Aux ID section 540 of packed object 520, thus in the next Read it can skip over the length section 525 and ID section 530 bits that it has already seen. Even a partial read of packed object's 520 Aux ID section 540 bits may suffice to precisely locate the start of the target's compressed data. Alternately, if the length of the known packed object 520 is small, the reader may determine that it would be faster to simply read the remainder of packed object 520 in one operation.

2.3.4 "Split" Packed Objects Directory Structure

If the presence of an external directory 580 is indicated (e.g., by a flag bit or pattern), the structure of the external directory 580 may follow one of the formats described above. Additional bits on each tag may follow the Directory bit to qualify the chosen Directory method.

An alternate Directory embodiment would encode no additional information per directory entry beyond what is naturally in the packed object 520 itself. This would be accomplished by "splitting" each packed object's data section 560 from its preceding sections. The preceding sections (e.g., length section 525 and ID section 530) of the packed object 520 on the tag would be sequentially encoded to form a Directory. The data section 560 of the packed object 520 (possibly Word aligned, to support control of access rights) would be encoded elsewhere on the tag. For example, all the data sections for the packed objects could be sequentially encoded at the low end of the tag, and the directory portions (e.g., length section 525 and associated ID sections) could be encoded in reverse order starting at the high end of the tag. The reverse is also a reasonable alternative, and has the additional benefit that a properly-sized initial Read of tag memory reveals its overall size and format, and also its Directory. Furthermore, the initial System information and the Directory may always be readable without a password, whereas an application may choose to password-protect reading of the all or a portion of the data sections 560.

Grouping the data at one end of the tag, with all the remaining Directory and System formatting information at the opposite end, simplifies the tag hardware to support a read-access password. With the Directory in front and the data segments at the back, a single forward-advancing or backward-advancing pointer would indicate the end of the non-read-protected area or the end of the protected area, respectively. A forward-advancing pointer could be used to point to the end of the Directory section, and thus could be read and used to optimize the reading of the directories of a large population of large tags.

2.4 Alternate Packed Object Format

As an alternative to the above format for a packed object 520, an expandable packed object 520 size indicator that can fill any size memory bank with a single Packed Object 520 can be used for user memory bank 460.

3. Methods

A serious problem in applying known formats such as ISO to Gen 2 tags (one of the problems addressed by the embodiments described in the present application) is the need to support an efficient Read command that ideally transfers no more bits over the air than is necessary to search for the desired tag data elements. In this regard, Gen 2 is a particular challenge, because a Gen 2 Read command has only two "length" options when reading user memory bank 460. Either a length of "0" is requested in which case the tag emits the entire contents of that memory bank, even if it is all or mostly unused and empty, or a specific read length is requested, in which case the Read command fails if too many words of data are requested.

Because tags from different manufactures, or even from the same manufacturer, have different capacities, extra reads (for example, of a Gen 2 tag's "TID" segment), plus a table lookup, would be required to pre-establish the memory capacity of a given Gen 2 tag. Moreover, existing format standards such as the ISO standard do not include encodation of the number of bytes of tag memory that currently hold user data. In short, the standard formats do not indicate an optimal read length (based on how many bytes actually contain user data), nor do they even indicate a "safe" length for a Read command of the user memory bank 460 (at least, not without an additional Read of the TID bank).

Section 3.1 describes methods for efficient reading of a tag population which minimize the number of bits read "over the air" from a tag. Section 3.2 describes methods for decoding alphanumeric subsection 966. Section 3.3 describes methods for the efficient encoding of user memory bank 460.

3.1 Methods for Efficient Reading of Tag Population

FIGS. 14A and B depict a flowchart 1400 of an exemplary method for optimizing a random access read of tags having packed object configurations, according to embodiments of the present invention. Flowchart 1400 is described with continued reference to the embodiments of FIGS. 4-13. However, flowchart 1400 is not limited to those embodiments. Note that not all of the steps in flowchart 1400 have to occur in the order shown.

FIGS. 14A and B describes a random access read of tags having packed object configurations. A reader may also read the entire memory contents of a tag in one Read operation. In this alternative, the reader then parses through the copy of the data now in reader memory to decode the data and/or identify whether the tag contains specific IDs of interest to an application. This entire read operation does not minimize the time it takes to transfer bits over the air from the tags. Options for optimizing reads of entire user memory bank 460 are described in Section 3.4.

In step 1404, a determination is made of how much data to request in an initial read of a tag. As part of this step, the smallest initial read may be established. The smallest initial read is set such that the read has a high likelihood of providing all of the bits needed to establish presence or absence of target IDs (i.e., read in the bits from the Length section 502 and ID section 504 of a Packed Object 406), with a low likelihood of a read-overrun error response from the tags. In addition, the largest single read may also be established. The largest single read is set such that the read will incur an acceptably-low re-transmit rate due to S/N or other factors such as "fade," with a low likelihood of a read-overrun error response from the tags.

The decoder in the reader will always be trading off a decision between fetching the fewest possible bits for an operation (but increasing the total number of read operations required), versus fetching more bits than is needed (but running the risk of reading past the end of valid data, and the worse risk of attempting to read past the end of user memory bank). In making this tradeoff, the decoder can place an upper bound on a "safe" read. For example, if the TID for the tag has been read, then the upper bound of the bank is known. In a further example, while parsing within a packed object 520, the upper bound of that packed object 520 is always known, from its first byte. While parsing near the end of a packed object 520, the decoder may want to read some extra bits, but may accidentally pass the end of the user memory bank. For this situation, the decoder can "guess" (based on knowledge of tags in general) that the bank boundary will always be at an integral number of words, and (from what is known today), on at least a 2-word (32 bit) boundary.

When making the determination of how much of user memory bank 460 to fetch on the initial Read, a decoder 206 in the reader may take into account a generic useable-minimum that may be known a priori. In an embodiment, the useable-minimum may be based on knowledge of tag hardware. A specific hardware population may have a minimum user memory bank 460 size. For example, it may be known that no vendor offers Gen 2 user memory bank 460 containing less than 32 bits.

In addition or alternatively, the useable-minimum may be based on knowledge of an application standard (e.g., EPCglobal standard). The application standard may define a minimum size for user memory bank 460. For example, after analyzing the user memory bank 460 format, a standards organization may determine that all use cases need more than three 16-bit words of user memory bank 460 to implement. Thus, the standard may note that a Read of four words (64 bits) never wastes more than 16 bits of air time if there are any contents in user memory bank 460. An application standard may go a step further and, for example, mandate that no application may use the approved format in a tag with less than 64 bits of user memory bank 460. This requirement allows a tag reader to safely execute an initial fetch of 64 bits from every tag that has its PC bit set to indicate the presence of a user memory bank may note that a Read of four words (64 bits) will never waste more than 16 bits of air time if there are any contents in user memory bank 460.

In addition or alternatively, an application body (including EPCglobal) may lay down some formatting rules which define the minimum initial read. For example, the application body may define a user memory bank 460 format which guarantees that an initial two-word Read operation (32 bits) will always either (i) provide a full (but internal) directory of a fairly small amount of user data (typically, a packed-object directory of up to three AI's will fit in that space), or (ii) will reveal the presence and location of an optional external directory 580 (for larger amounts of data). In this case, a Reader can conduct a very efficient Search operation by reading just 32 bits during its initial read of a tag. In further alternatives, the useable-minimum and/or useable maximum may be data-item-specific and/or take into account application-specific ordering rules.

Under most conditions of Signal to Noise (S/N) ratio and bit rates, it may make sense to read a fixed minimum or maximum number of bits (such as 64 bits) as the initial Read of every tag, even if the ID list is virtually guaranteed to be in fewer (such as the first 32 bits). For example, in certain applications, the ID and associated data may be included in the initial bits of user memory bank 460. Under these conditions, the Reader 104 may decide that, for the first Read of a tag's user memory bank 460, it makes sense to bring in more than the small number of bits needed to search for the ID, because in the application, it is likely to bring in both the ID and the Data in a single Read that is still not unreasonably slow to fetch, and can avoid the handshake time of executing a second read.

A standards organization may also define an alternate identifier format to improve read efficiency for a specific application and/or industry. For example, an application may want to know what shipment each item came in for various reasons. In this example, a Reader may be instructed to look only for an SSCC-18 (a serialized shipping container code, denoted as AI 00) in the user memory bank 460 of every tag it sees. However, the application does not require the most-significant "extension" bit of the AI 00 data string. Furthermore, the retail pipeline application standard may mandate that if an SSCC-18 is encoded in user memory, it shall be the first data item encoded. To allow most SSCC-18's to fit in the first 64 bits of memory (if it's the only item in memory), the standards organization may further define an alternate header for AI (00) so that a single AI (00) data item can fit within the first four words (64 bits) of user memory bank 460. This could in fact be accomplished via an alternate Header definition which drops both the first digit (the Extension Digit, which the Reader will assume is '0' and will prepend to the decoded data string) and the mod-10 check digit (which Reader will calculate and append to the end of the decoded data string). Thus, any customer who ships fewer than 10,000,000,000 shipments per year (and thus who does not need to increment the Extension Digit in order to guarantee unique shipment ID) may use this more-compactable header for AI 00. Under this scenario, the Reader can always fetch the first 64 bits of user memory bank 460 in the first read, because it is virtually guaranteed not to need a second Read operation on any tag. In this application, a 64-bit Read is not an unreasonable burden.

In contrast, if a Reader is looking for one or more data items that may require much more than 64 bits to fully acquire, and/or if only a small percentage of the tag population is expected to contain the target data item(s), the first Read is set to the directory-based maximum of 32 bits.

The reader may also determine an initial read which minimizes the likelihood of a read overrun error. As described above, the smallest legal packed object 520 (if Word-aligned) will require at least two words of storage. The length section 525 must be at least 10 bits long and the ID section 530 must be at least 7 bits long (which already exceeds one Word in length). Moreover, the shortest likely data length is 16 bits (a Custom-Compacted Date field). Thus, it is extremely unlikely that a two-word read of either the first or possible subsequent packed objects 520 (whether Byte or Word aligned) will cause a read-overrun error, unless no packed object 520 exists at the starting Read location.

As part of step 1404, the reader may estimate a projected user memory bank 460 size for the target tag population and a projected re-transmit rate. The initial size estimate, for safety against Read Overruns described above, assumes a "Small" estimate for the Number of ID section 626 values and length of packed object 627. A "Small" packed object 520 provides sufficient information in the first 32 bits of the packed object 520 to allow a reader to determine the overall size of packed object 406, the number of IDs, and even the complete list of IDs in that packed object 520. As each tag in the population is singulated, this initial size estimate can be revised upwards if necessary. The revision may be based on the ongoing gathering of statistics such as memory bank size based on TID lookup, read overruns on previous tags in the same selected population, and/or optionally gathering separate statistics for each distinct EPC Manager Number (possibly coupled with distinct Product ID, and even with Serialization range).

As each tag in the population is singulated, the retransmit-rate estimate can be revised upwards or downwards if necessary, based on the ongoing gathering of relevant statistics such as actual retransmits, measured S/N ratios, tags that fade out of range, etc.

The reader then establishes a sufficient Initial Read for a projected small packed object 520. In an embodiment, an Initial Read of the first two words of each packed object 520 will usually return a complete Length section 525 and a complete ID section 530, which is fully sufficient for accomplishing the two objectives of an efficient packed object 520 search. The first objective is determining whether the target ID or IDs are encoded in that packed object 520. The second objective is determining if the target ID or IDs is not present, how many words can be safely skipped, in order to read the Length section 525 and ID section 530 of the potential next packed object 520.

As described above, the first byte of packed object 520 indicates the object length 627, that is, how many bytes are currently used by the packed object 520. In a small tag, this is literally equivalent to stating the number of memory bank bytes that are in use. This same first byte also indicates the number of IDs, that is, how many ID section 530 bytes follow. Thus, a read of just a single byte of user memory bank 460 (the byte at the start of a Packed Object 520) indicates the "safe" maximum number of bytes that could fetch the entire contents of packed object 520 in a single additional Read command (without wasting any unnecessary transfers of unused bits), and the "safe" minimum number of bytes that could fetch (in a second small Read operation) the entire list of ID's packed into that object, but without transferring any data bits at all (useful if the interrogator is looking for a specific ID or two, in a large population of tags). Because most IDs are identified using only 8 bits (some popular combinations need only four bits per ID and a few less-often-used IDs require more than 8 bits), a two word read may return the length section plus up to 3 ID values. In a relatively small tag, (i.e., small enough to be filled using only one packed object 520), the first two words (the start of the packed object), therefore contains a complete directory section in an extremely efficient format for quick access.

Note that during the initial read, a reader may elect to read the DSFID 510. Since the first packed object 520 is preceded by at least one byte (of DSFID 510), and since the smallest packed object 520 is at least four bytes long, the smallest useable user memory bank 460 is greater than 32 bits, so a decoder can guess that all tags with valid user memory have at least 64 bits available. This enlarges the upper bound on the first read of the memory bank, to the point where, if data is available, all of the ID section bytes of the first packed object 520a will always be fetched by the first 4-word Read operation at the start of the user memory bank. For tags only large enough to contain one max-sized packed object 520, therefore, a single 4-word Read per tag will completely fetch all the bits necessary to search for specified IDs.

The reader may also determine the relative efficiency of one longer Read versus multiple shorter Reads in step 1404. Once the previous considerations have been established, the Reader can establish the relative probability that one longer read or two or more shorter reads will accomplish the necessary goal; along with a predicted re-transmit probability for each approach. Then, given the forward and reverse link rates that have been established during singulation of a particular tag, the Reader can predict the average total time to completion for each approach, and pick the one with the shorter predicted time. To a large extent, the steps above can be conducted in arbitrary order, until sufficient information has been gathered to make these predictions.

In summary, the initial read size is determined by the reader based on a number of factors such as those described above. In general, in the initial Read access of user memory bank 460, it is desirable if most (or even all) of the following information is made available in a relatively small number of bits at a known location in the tag: whether the tag's memory has been formatted at all, and if so, whether formatted to use packed objects 520 or some other method (such as existing ISO formats), what default data system (such as AI's or DI's) is in use, whether or not any user data is currently encoded on the tag and if so, how many bytes of data is currently encoded, whether or not the tag contains an external directory structure, how many bytes of User Memory 400 are available on the tag, and whether other features such as Sensor inputs are supported in the memory space of the tag.

Note that some of the above information (such as the size of the user memory bank 460) may be fixed at time of tag manufacture, while some of the information may preferably be written only once in the tag's lifetime (such as the formatting information), while yet other information is inherently dynamic over time (such as the number of currently encoded bytes, and the directory's contents).

An example of a first read may always read 8 bytes (64 bits). This initial read will retrieve DSFID 510, and "sys info" byte, and $1^{st}$ 6 bytes of $1^{st}$ packed object 520 (or if there is no DSFID 510, gets first 8 bytes of packed object 520). That typically yields full length information and full ID information.

In step 1406, the initial read of the size and range determined in step 1404 is performed.

In step 1408, a determination is made whether the initial read returned a full length section 525 and a complete ID section 530 or complete listing of ID values. This situation will very rarely happen on small tags, and it is virtually impossible for length section 525 to exceed 32 bits on any tag. However, it is possible that ID section 530 will be incomplete after the initial read, if many data items have been grouped into one packed object 520 on a larger tag. In the initial read, the Reader obtained two key pieces of information for optimizing a subsequent read: the number of packed object bytes remaining to be read (from object length field 627), and the number of ID values remaining to be read. The number of ID values remaining to be read can be determined using the number of ID values in packed object 520 (number of IDs field 626) and the number of ID values actually received in the initial read.

In step 1410, a second read is performed. Based on the same statistics and heuristics described above, a reader could choose to read the remainder of the packed object 520 in the next Read, or the reader could choose to execute a potentially far smaller Read by estimating how many more bits remain in ID section 530. This estimate can extrapolate from the average number of bits per ID the reader has seen thus far on the tag, and/or consider the average from prior tags in this population. If the reader chooses to read the remainder of the packed object 520, operation proceeds to step 1485. If the reader chooses to read the remainder of the ID section, operation proceeds to step 1412.

In step 1412, a determination is made whether the received ID values are unambiguous. The first byte of a packed object 520 includes a value indicating the number of ID section bytes that follow. However, to save encoded bits, not all ID's are fully described by a single ID section byte. As described above, the ID Header table may include one or more entries associated with multiple identifiers. For example, a single ID header entry may be defined for every currently-defined GS 1 AI that could be the target of a specific search. An ID Header table may also support non-GS 1 ID's called DI's and support ranges to cover GS1 AI's that have yet to be specifically defined. Both of these cases result in ID's that are not fully definable in 8 bits, and for these cases a fixed number of additional bits are encoded in a following Aux ID section 540. Although this technique both minimizes bit count and maximizes search efficiency for the vast majority of AI's, it does leave some ID's in a state where an additional read is required after the first set of ID section bytes have been read. If the reader determines that the received ID values were unambiguous, operation proceeds to step 1416. If the reader determines that the received ID values were not unambiguous, operation proceeds to step 1414.

In step 1414, the reader determines from the list of ID values obtained in the initial read(s) how many additional bytes would need to be read in order to complete the requested search. The reader then performs a read of the tag user memory for the additional bytes. Operations proceeds to step 1416.

In step 1416, the reader determines the list of IDs included in the packed object 520. In an embodiment, the reader determines the list of IDs by parsing the received length section 525, ID section 530, and Aux ID section 540, if retrieved.

In step 1418, the reader determines whether the ID or IDs of interest are included in the packed object 520 being processed. If one or more IDs of interest are included, the data content for these ID's is obtained as described in steps 1420-1440. If no IDs of interest are included, operation proceeds to step 1460.

In step 1420, the reader determines the position of the target ID's data within data section 560. Various alternatives exist for making this determination based on the memory format of the tag. For example, in Alternative A, the memory format is fully optimized for random access rather than encoding efficiency. In Alternative A, each data element in the packed object 520 is independently encoded, so that a desired data element could be decoded without reading any data bits for any other data element. Extra information is also explicitly encoded so that, once a targeted ID was found on a tag's ID list, the reader would immediately know the starting location of that ID's data within the tag's memory. Both of these characteristics provide for simple, optimized random access at the cost of additional encoded bits. Alternative A includes step 1422.

Alternative B places a higher priority on minimizing encoded bit count. The memory format for alternative B is described in detail above. For encoding efficiency, two or more data elements may be concatenated and encoded as a single unit (for example, all of the pure-numeric fields are grouped, so that they can encode at maximum efficiency). No bits are wasted to provide random-access indexing to the start of each data element within a packed object 520. The memory format of Alternative B provides for virtual random access without the concomitant overhead. It does this by segmenting the encoded data of each packed object 520 into three segments. A first segment, custom compaction subsection 962, is reserved for fixed-length special compaction methods for specific identifiers (for example, compacting a six-digit data field into only 16 bits). A second segment, known-length numerics subsection 964, is reserved for always-all-numeric identifiers and a third segment, alphanumerics subsection 966, is reserved for identifiers whose data may contain both digits and non-numeric characters. To determine the position of a target ID in alternative B, the reader calculates compressed data element sizes based on a priori table information, and may further need to also parse Aux ID section 540 (if any of the ID's invoke Aux ID section 540 data). Alternative B includes steps 1432-1438.

In step 1422, the location of the ID data in data section 560 is determined based on information obtained in the initial read(s) as described above. Operation proceeds to step 1440.

In step 1432, the reader examines the complete list (or a portion of the list) of ID values and establishes which subsection of data section 560 each data element will be assigned to for encoding. This step establishes which compressed data elements precede the target ID data element within data section 560.

During step 1432, a reader may examine the appropriate Header table(s) to determine which segment the identifiers data will be encoded into. This step allows the reader to minimize over-the-air bit transfers by skipping over any preceding segments that can't contain the target identifier data (and of course skipping any trailing segments as well). For instance, if the reader was asked for AI 311n, and the tag's list of ID's showed (in the first 3 bytes of tag memory after the Length Indicator) AI 17, AI 310n, and 311n, the reader could minimize bit transfer by skipping CustomCompaction subsection 962 of packed object 520 (which would encode the sixteen bits of data for AI 17). Since in this case the encoder chose to include two always-numeric data elements in the same packed object 520, the decoder calculates the number of digits encoded (in this case, twelve) and then fetches from the tag at least the corresponding number of base-10 bits (in this case, 40). After decoding these 40 bits back into twelve digits, the decoder skips the first six digits (which would have to represent the data of AI 310n), and uses following six digits (the data of AI 311n). The fetches would include as few "extra" bits in front of and behind those needed bits as is necessary to achieve Word alignment of the Read operation (a Gen 2 requirement).

Note that a tag encoder can cooperate to further improve this random-access efficiency, by deliberately deciding which identifiers to pack together in a single packed object 520—the encoder's objective could be to re-arrange the input identifiers so that a single packed object 520 would contain (in order) (1) any number of fixed-length custom-compaction subsection 962 data items, followed by (2) any number of fixed-length always-numeric data items (a part of known-length numerics subsection 964), followed by (3) at most one variable-length always-numeric data item (also a part of known-length numerics subsection 964), followed by at most one data item for the non-numeric segment (a part of Alpha Numerics Subsection 966). Following these rules, a particular packed object 520 provides virtually complete random access—the offset of every contained data element can be calculated before any data bits are parsed—yet incurs no extra overhead bits to provide indexing into packed object 520 to locate the individual data elements. The only exception under these guidelines is that, if variable-length always-numeric data is included, then the decoder needs to fetch a known number of bits at the start of that segment (which encode the variable number of digits actually encoded), so that the overall length of the always-numeric data segment (a part of known-length numerics subsection 964) can be determined (even for only skipping over it, to access AlphaNumerics subsection 966).

In step 1434, for each ID whose data will precede the target ID data, the reader determines whether Aux ID section 540 bits must be parsed in order to determine the encoded size of these preceding data elements. Also, in this step, the reader determines whether Aux ID section 540 data bits are needed to determine the encoded size of the target ID data element itself. This step results in an exact calculation of the minimum number of Aux ID section bits that need to be read in order to locate the start and end of the target data element. If Aux ID section data bits are needed, operation proceeds to step 1436. If no Aux ID section data bits are needed, operation proceeds to step 1438.

In step 1436, if any Aux ID section bits were determined to be necessary, the reader reads these bits (at a minimum), if not already in Reader memory from the initial read(s). If an additional Read is found necessary to obtain the needed Aux ID section bits, then a further optimization can be considered. Based strictly upon the a priori "size knowledge" in the ID Header tables as illustrated in FIGS. 8A-E, including the exact lengths of fixed-length AI's and the minimum and maximum lengths of variable-length all-numeric AI's, upper and lower bounds can be established on the number of newly-read Words that would suffice to obtain not only the needed Aux ID section bits but also a sufficient number of data section bits to fully encompass the target data. Based on measured statistics from singulating this tag and/or other measurements or heuristics, the Reader can determine whether it would be faster to do two reads (one small one to fully locate the target data, and a second read to obtain the target data), or one read (which, to a high probability, will obtain both the Aux ID section bits and enough data section 560 bits to encompass the target data).

In step 1438, an object directory (possibly partial) is constructed by parsing the set of Aux ID section bits, if needed to yield the locations of each data element up to and including the target data element.

In step 1440, ID data is read from the determined location in tag user memory bank 460. If the ID data is custom compaction data, the data is decoded according to custom compaction encoding rules in step 1452.

If the ID data is numeric, the data is decoded using the appropriate numeric base in step 1454. For example, during the process of decoding numeric data, the reader records the implied fixed lengths (from the appropriate ID Header table) and the encoded variable lengths (from the Aux ID subsection 540), in order to parse the packed object's compressed data. The decoder, when recording any variable-digit bit patterns, must first convert them to variable digit-string lengths per the table (for example, a three-bit pattern may indicate a variable digit-string length in the range of two to nine).

If the ID data is alphanumeric, the data is decoded using an alphanumeric decoding process in step 1456. The alphanumeric decoding process is described in further detail in Section 3.1.1 below. Operation then proceeds to step 1460.

In a relatively large tag, there may be a series of two or more packed objects 520, each with a "mini-directory" of several IDs. However, because the IDs are always grouped at the start of each packed object 520, along with a useful length indicator section 525 having both the number of ID section 626 and the overall number of bytes in packed object 627, the total number of read operations needed to search a large tag is still minimized, as is the number of bits transferred during the search (again, all the data bits can be "skipped," and not transferred over the air, during a search operation). Steps 1460-1480 describe reader interrogation of a tag with multiple packed objects.

In step 1460, a determination is made whether an additional packed object read should be performed. If an additional packed object read is to be performed, operation proceeds to step 1470. If no additional packed object read is to be performed, processing ends.

In step 1470, a read of the next packed object is performed. As described in step 1404, the reader determines the size of the read of a packed object.

In step 1480, a determination is made whether the first byte of the packed object is zero or whether an error was returned from the tag. A zero in the first byte of a packed object indicates that no additional packed objects exist in user memory bank 460. If the first byte of the packed object is zero (or an error received), processing ends. If a valid value is received in the first byte, operation returns to step 1408.

In a system such as ISO 18000-6c, where all Reads are by necessity Word-aligned, it should be understood that the reader must, for each new calculated read, additionally calculate the minimum number of aligned Words that encompasses both the starting and ending bit positions of the desired data.

Note that statistics can be gathered by the Reader to further optimize Read operations (e.g., deciding to fetch more than the minimum number of bits). For example, statistics based on behavior during Singulation such as how quickly can the tag transmit its data, how many tags are in the population (estimated, based on Q algorithm performance) and what percentage of tags seen thus far have the desired Data ID's can be used to optimize operations. In addition, information based on the tags read thus far such as what are the average number of items in a tag's user memory, what is their average size, what percentage contain DIs and so forth can be used for optimization.

3.2 Methods for Decoding an Alphanumeric Subsection

FIGS. 15A-C depicts a flowchart 1500 of an exemplary method for decoding an alphanumeric subsection 966 of a packed object 520, according to embodiments of the present invention. Flowchart 1500 is described with continued reference to the embodiments of FIGS. 4-13. However, flowchart 1500 is not limited to those embodiments. Note that not all of the steps in flowchart 1500 have to occur in the order shown.

Within the alphanumeric subsection 966 of a packed object 520, the total number of data characters is not encoded, nor is the bit length of the character map, nor are the bit lengths of the succeeding base 256 sections (representing the numeric and non-numeric base 256 values). As a result, the decoder follows a specific procedure in order to correctly parse the alphanumeric subsection 966.

In step 1510, the total number of non-pad bits in the packed object 520 are determined. Step 1510 includes steps 1512-1516.

In step 1512, the decoder examines the pad indicator bit 628 of length section 525 to determine whether the bit indicates the inclusion of pad bits (e.g., pad indicator bit value is '1'). If the pad indicator bit indicates pad bits, operation proceeds to step 1514. If the pad indicator bit indicates no pad bits, operation proceeds to step 1520. In this case, the number of non-pad bits is equivalent to the object length 627.

In step 1514, the decoder examines the last byte to identify the number of pad bits. As described above, in an embodiment, bitwise padding begins with the least-significant or rightmost '1' bit of the last data byte, and the padding consists of this '1' bit, plus any '0' bits to the right of that bit.

In step 1516, the decoder determines the number of non-pad bits in the packed object 520. The number of non-pad bits is equivalent to the difference between the object length and the number of pad bits identified in step 1514.

In step 1520, the decoder keeps a count of the total number of bits parsed thus far, as each of the subsections of the packed object prior to alphanumeric subsection 966 is processed.

In step 1530, the decoder parses a portion of the alphanumeric header 1071 and adds this number to the previous value of the total number of bits parsed (TotalBitsParsed).

In step 1534, a DigitsCount is initialized to the total number of numeric values indicated by the prefix 1074 and suffix 1076 (which may be zero). In addition, a NonDigitsCount is initialized to the total number of non-numeric values indicated by the prefix 1074 and suffix 1076 (which may be zero). FIG. 16 illustrates a table showing the initialization values for DigitsCount and NonDigitsCount, according to embodiments of the present invention.

In step 1536, the character map bit string is initialized to the length as indicated in the prefix bits and the indicated value. As described above, the prefix field 1074 includes a base identification bit 1074*b* indicating whether a numeric or non-numeric run length is present in the prefix and a length field 1074*c* indicating the length of the run.

In step 1540, the number of bits required to encode the number of numeric characters (DigitBits), as indicated by the current value of DigitsCount, is determined.

In step 1542, the number of bits required to encode the number of non-numeric characters (NonDigitBits), as indicated by the current value of NonDigitsCount, is determined.

In step 1546, the number of alphanumeric bits is determined as the sum of DigitBits plus the NonDigitBits.

In step 1550, a determination is made whether the sum of TotalBitsParsed and AlnumBits equals the non-pad bits in the packed object 520. If the values are equal, no more bits remain to be parsed from the character map, and so the remaining two bit patterns, represented base 256 values are ready to be converted back to the specified base. Operation proceeds to step 1580. If the values are not equal, operation proceeds to step 1560.

In step 1560, infix processing is performed. Infix processing includes steps 1561-1569.

In step 1561, a determination is made whether an infix is present by analyzing the value of the infix present bit 1075*a*. If an infix is not present, operation proceeds to step 1580. If an infix is present, operation proceeds to step 1562.

In step 1562, a determination is made whether infix field 1075 included a non-zero offset value. If a non-zero offset value was included, operation proceeds to step 1563. If a zero offset value was included, operation proceeds to step 1569.

In step 1563, an offset counter is incremented.

In step 1564, the next bit is obtained from the character map 1077. This bit is then appended to the end of the character map bit string.

In step 1565, the value of the character map bit is determined. If the value is '0,' DigitsCount is incremented in step 1566. If the value is '1,' NonDigitsCount is incremented in step 1567. Operation then proceeds to step 1568.

In step 1568, a determination is made whether the counter is equivalent to the offset. The start of the infix run length is indicated when the counter is equivalent to the offset. If the values are equal, operation proceeds to step 1569. If the values are not equal, operation returns to step 1563.

In step 1569, the decoder appends a sequence of bits having a length equal to the run-length of the infix length. The value of the bit sequence is set to the value of the run-length indicated in the infix field. In addition, if the bit sequence is numeric, DigitsCount is incremented by the run-length. If the bit sequence is non-numeric, NonDigitsCount is increment by the run-length.

In step 1570, the value of DigitBits, NonDigitBits, and the number of alphanumeric bits are updated.

In step 1572, a determination is made whether the sum of TotalBitsParsed and AlnumBits equals the non-pad bits in the packed object 520. If the values are equal, no more bits remain to be parsed from the character map, and so the remaining two bit patterns, represented base 256 values are ready to be converted back to the specified base. Operation proceeds to step 1580. If the values are not equal, operation proceeds to step 1574.

In step 1574, the next bit is obtained from the character map 1077. This bit is then appended to the end of the character map bit string.

In step 1576, the value of the character map bit is determined. If the value is '0,' DigitsCount is incremented in step 1577. If the value is '1,' NonDigitsCount is incremented in step 1578. Operation then proceeds to step 1580.

In step 1580, a determination is made whether a suffix is present by analyzing the value of the suffix present bit 1076*a*. If a suffix is not present, operation proceeds to step 1590. If a suffix is present, operation proceeds to step 1582.

In step 1582, the decoder appends a sequence of bits having a length equal to the run-length of the suffix length. The value of the bit sequence is set to the value of the run-length indicated in the suffix field. In addition, if the bit sequence is numeric, DigitsCount is incremented by the run-length. If the bit sequence is non-numeric, NonDigitsCount is increment by the run-length.

In step 1590, the values of DigitBits and NonDigitBits are updated.

In step 1591, the reader fetches the next set of bits, whose length is indicated by DigitBits, converts this number of bits from base 256 values to a series of base 10 values, adds 48 to each value, and stores the resulting array of values as DigitString.

In step 1592, the reader fetches the final set of bits, whose length is indicated by NonDigitBits, converts this number of bits from base 256 values to a series of values encoding in the specified base, and stores the resulting array of values as NonDigitString.

In step 1594, an interleaved character string is created, representing the concatenated data strings from all of the non-numeric data strings of packed object 520, by parsing through the Character map bit string.

In step 1596, for each '0' bit encountered in the Character map bit string, the next character from DigitString is copied to InterleavedString.

In step 1598, for each '1' bit encountered in the Character map bit string, the next character from NonDigitString is retrieved and its base value is converted to an ASCII value. The resulting ASCII value is stored in InterleavedString. Note that if '1' bits represent Base 30 values rather than Base 118 values, then some Base 30 values may represent Shift characters. When one of these is encountered, the next '1' bit in the character map bit string is skipped. An additional Base 30 value is then fetched from NonDigitString. The current pair of Base 30 values is then converted to a single ASCII value.

In step 1599, once the full character map bit string has been parsed, the InterleavedString is completely populated. Starting from the first non-numeric identifier on the identifier list, the characters from the InterleavedString are copied to each identifier entry, ending each copy operation at the next space character in InterleavedString (if copying characters to an AI), or the next GS character in InterleavedString (if copying characters to a DI), or at the end of the InterleavedString, whichever comes first.

Note that Alphanumeric subsection 966 ends with three variable-length bit fields (the character map 1077, and two base 256 sections 1078 and 1079 (representing the numeric and non-numeric base 256 values), but that the none of the lengths of these three variable-length bit fields are explicitly encoded. As a result, the decoder must follow a specific procedure, using knowledge of the remaining number of data bits, in order to correctly parse Alphanumeric subsection 966, as described above. This is also the reason why, when individual A/N data strings are "split off" as described earlier, each split A/N element requires an encoded Character Map Length, because the above-cited procedure can only be applied to the last variable-length field of an Object.

3.3 Methods for Encoding Data Items

The following section describes methods for encoding a packed object. Encoding may be performed by any suitable computing device, including but not limited to, an RFID reader. FIG. 17 depicts a flowchart 1700 of an exemplary high-level method for encoding a packed object, according to embodiments of the present invention. Flowchart 1700 is described with continued reference to the embodiments of FIGS. 4-13. However, flowchart 1700 is not limited to those embodiments. Note that not all of the steps in flowchart 1700 have to occur in the order shown. Not all techniques that could be used to encode a packed object are described in flowchart 1700. These additional techniques are described above or would be apparent from the description of user memory format 460.

In step 1710, a set of data items to be encoded is received.

In step 1715, a determination of the data system associated with each data item is made.

In step 1720, the set of received data items may be re-ordered to minimize out-of-system shifts. Step 1720 is optional. Since the first ID listed in a packed object 520 establishes the default data system within that packed object 520, an encoder can count the IDs from each data system, and employ either or both of two strategies. First, the "majority" data system may be placed first on the list. In addition or alternatively, the list may be split between two or more packed objects 520, of different default systems, to minimize the number of out-of-system "Shifts" within each of packed object 520.

In step 1725, each data item in the received set of data items is associated with a packed object 520. Step 1725 is optional. A subtle advantage of a packed object structure is that, at the source, the encoder can be instructed to group specific data items together, in order to ensure that they cannot be re-written separately or independently in the future. This can help ensure that data items with interdependencies stay synchronized. For example, a change in packaging is likely to change more than one of the Logistics Width, Length, and Height AI's stored for a given item. Thus, as an added safety measure, these should be stored in the same packed object 520.

In step 1730, the alphanumeric data items associated with a packed object are identified and re-ordered to maximize Prefix bit(s), Infix bit(s), and Suffix bit(s) run lengths. Step 1730 is also optional. Since the total encoded length of a series of Fixed and/or Known-Length Numeric subsection data items is the same, regardless of the order in which their IDs are listed, the encoder is free to reorder and group the A/N IDs without constraint. Given that an Infix bit(s) description requires more bits than a Prefix bit(s) or Suffix bit(s) description, the encoder should reorder A/N IDs with that in mind. For example, if A/N Data String 1 has a long same-base suffix bit but not a long-run prefix bit(s), while A/N Data String 2 has a long prefix bit(s) but not a long suffix bit(s), then the order of their two IDs should be reversed before encoding. Alternatively, if a first A/N string ends with a non-numeric prefix bit(s), and a second ends with a non-numeric suffix bit(s), then it may be beneficial to reverse their order, as their combination (joined with an FNC1) will form a long non-numeric Infix bit(s) run.

In addition or alternatively, in step 1730 A/N data can be split using two or more A/N Headers. Splitting A/N data inherently increases overhead by requiring additional A/N Headers, and can further reduce efficiency by eliminating long same-base runs (such as those that can be created by the intelligent reordering of A/N IDs as just described). However, in some cases better runs can be created by separating the items. For example, two data items may each both begin and end with a numeric run. If combined, however, a maximum of only three runs can be specified, and one will be "lost." Furthermore, the encoder should examine the characteristics of each A/N data item independently, and if certain characteristics differ strongly, then it may be more efficient to split the A/N items. For example, if only one of two A/N items requires Base 118, then the non-numeric encoding efficiency of the other item will be impaired if they are grouped.

In step 1735, the ID header index value for each data item or for a group of data items is determined. As described above, a set of IDs may be grouped together in the ID header index. If two or more data items in the set are present, these data items will be assigned a single index in the packed object. The ID header index values are then encoded in ID Values subsection 732 of ID Section 530.

In step 1740, a determination is made whether any auxiliary information is required to be encoded in packed object 520. For example, the ID header table entry for the data item may include data which requires an "Aux ID nibble" to be encoded in Aux ID section 540. Additionally, the formatting rules for a data item may indicate auxiliary information is required. The Aux ID information is then encoded in Aux ID section 540.

In step 1750, the data associated with each data item is encoded and the length of each encoded data item is calculated. The current length of the packed object may also be determined in this step. Note that for alphanumeric data items, the alphanumeric (A/N) header information is also encoded in this step.

In step 1760, the encoder determines whether any padding is required for the data section 560 and adds the appropriate number of pad bits to the data section.

In step 1770, the total length of the packed object is updated to account for any additional pad bits, if present. In addition, the pad bit indicator value is set to indicate whether any pad bits were added. The length section 525 is updated to include the object length and pad indicator value.

In step 1780, the packed object 520 is assembled as illustrated in FIG. 5.

The following is an example of a method for encoding a packed object. The example illustrates a number of the techniques that can be invoked when encoding a packed object 520. In the example, the input data is represented using AIs.

This data items to be encoded are an Expiration date (AI 17) of Oct. 31, 2006, a Lot Number (AI 10) of 1A23B456CD, and an Amount Payable (AI 391n) of 1234.56 Euros ("978" is the ISO Country Code which will indicate that the amount payable is in Euros). The resulting input data string is: (17) 061031(10)1A23B456CD<GS>(3912)978123456

The encoder determines the appropriate Header ID table index to associate with the three AIs using the AI Header table illustrated in FIGS. 8A-E. As shown in the table, the 17/10 combination is commonly seen, and thus the AI pair has been assigned a single value of 126(decimal). Also as shown in FIGS. 8A-E, AI 391n has an ID Byte Code of 51(decimal). This results in length indicator bits 7-6 being assigned the value 01 indicating two ID bytes will follow. Length Indicator bits 5-0, representing the object length, are to be determined. The first ID byte of ID values section 732 is set to 126 (decimal) and the second ID byte of ID values section 732 is set to 51 (decimal).

Next, the encoder finds that one of the three AI's, AI 17, is defined as using a CustomCompaction mode, for compacting a six-digit date field into sixteen bits. Thus a sixteen-bit pattern is calculated and appended after the "aux-nibble." The date of Oct. 31, 2006 is represented in AI 17 in YYMMDD format as "061031". However, the CustomCompaction mode (as defined in the EAN.UCC Composite Symbology specification) uses the formula YY*384+(MM−1)*32+DD, which in this case evaluates to (6*384+9*32+31), which is encoded as the 16-bit binary pattern "0000101000111111."

Next, the encoder finds that one of the three AI's, AI 391n, is defined as all-numeric, with both a fixed component of three digits (in this case, for the ISO currency code), and a variable component of up to 15 digits, whose length is to be encoded into four bits. Thus, a Known-Length-Numeric subsection 964 is encoded. In addition, the length of the variable digits is encoded in the bit field 742 of Aux ID section 540 (a four-bit pattern of '0110' is encoded). The encoding of the data item is a bit-pattern encoding 9 digits (the six variable digits, preceded by the three fixed digits predefined for this AI). The encoder determines that 30 bits need to be encoded in order to represent a 9-digit number as a binary value (as illustrated in FIG. 16). In this example, the binary value equivalent of "978123456" is the 30-bit binary sequence "111010010011001111101011000000."

Note that, so far, the total number of encoded bits is 8+16+4+16+4+30 or 78 bits, representing the length section 525, two ID bytes of ID section 530, Aux ID section 540, one CustomCompaction field 962, and one Known-Length-Numeric compacted data field.

At this stage, only one non-numeric AI data string (for AI 10) remains to be encoded in the Alphanumeric subsection 966. The source data string is "1A23B456CD." This string contains no characters requiring a base-30 Shift out of the basic Base-30 character set, and so Base-30, rather than Base-118, is selected for the non-numeric base (and so the first bit of the Alphanumeric subsection 1072 is set to '0' accordingly). The data string does not include an extended run-length of characters from the same base (e.g., more than 5 characters) in the first, central, or last section of the data string. Therefore, the next three bits are set to '000' (indicating that Prefix bit(s), Infix bit(s), and Suffix bit(s) are not run-length encoded). Thus, a full 10-bit Character Map 1077 needs to be encoded next. Its specific bit pattern is '0100100011', indicating the specific sequence of digits and non-digits in the source data.

Up to this point, the AlphaNumerics subsection 966 contains the 13-bit sequence '0000100100011.' The encoder can then determine that lengths of the two final bit sequences (encoding the Base-10 and Base-30 components of the source data string) are 20 bits (for the six digits) and 20 bits (for the four uppercase letters). The six digits of the source data string "1 A23B456CD" are "123456", which encodes to a 20-bit sequence of "00011110001001000000" which is appended to the end of the 13-bit sequence cited at the start of this paragraph.

The four non-digits of the source data string are "ABCD" are converted to a sequence of four Base-30 values 1, 2, 3, 4 (denoted as values $v_3$ through $v_o$ in the formula below. These are then converted to a single Base-256 value, using the following formula:

$$30^3 * v_3 + 30^2 * v_2 + 30^1 * v_1 + 30^0 * v_0$$

In this example, the formula calculates as (27000*1+900*2+30*3+1*4) which is equal to 070DE (hexadecimal) encoded as the 20-bit sequence "00000111000011011110" which is appended to the end of the previous 20-bit sequence. Thus, the Alphanumerics subsection 966 contains a total of (13+20+20) or 53 bits, appended immediately after the previous 78 bits, for a grand total of 131 significant bits in the packed object 520.

The final encoding step is to calculate the first byte of the packed object 520 (length section 525) and to pad-out the last byte (if necessary). The grand total of 131 bits included the two ID section bytes; subtracting out these 16 bits leaves 115 bits in the data section 560. Dividing 115 by eight shows that a total of 15 data section bytes are required to hold 115 bits, but that only the first three bits of the last of data section bytes are significant. Thus, the length section byte is "0001101110" where the leading '0001' indicates two ID section bytes, the central '1' indicates that padding bits are present in the last data byte, and '01110' indicates 15 data bytes. The first 16 bits of the 131-bit sequence are stored in the two ID section bytes, then all but the last 3 bits of the sequence are stored in the first 14 data section bytes. The last three bits of the data sequence (in this case, the trailing '110' of the 20-bit Base-30 sequence) are stored as the most significant bits of the last of the data section bytes, followed by a '1' bit and four '0' bits to fill out the last byte (so that the least-significant '1' bit in the last byte correctly indicates the start of the pad bits).

3.4 Minimized Read Time Optimizations of Reads of Entire User Memory

When commanded to read all of user memory bank 460 of a population of tags, total Read time can be optimized, using averages obtained from previous tags of the population, and if needed, using the length information obtained from an initial read of the head of packed object 520 structure of each newly-singulated tag.

Since the preceding select operations will usually narrow the population to tags with similar characteristics, statistics from previous user memory bank 460-reads of tags of this same inventory round will tend to be good predictors. Measurements of the average number of data-bearing words of user memory bank 460 will typically yield a good estimate of the number of words that are likely to result in a complete read of the next tag.

An attempt to read all valid user memory bank 460 contents at once, as estimated above, might be optimum under ideal conditions, but a statistic of average retries per read length may reduce the ideal read target in noisy conditions.

Further, if the number of valid (non-empty) words varies widely across previous tags, then correspondingly the average number of empty words per "optimum" full-tag read will rise correspondingly. If this "wasted airtime" average approaches or exceeds the overhead time of multiple reads and responses, then multiple shorter reads becomes more attractive.

A "floor" or minimum number of words per initial read is a further component of the optimization. A priori Reader knowledge, such as lower bound imposed by packed object 520 structure itself, allows the Reader to set a "floor" (such as 32 bits) for the shortest initial read that makes practical sense. Such a priori knowledge can also include results of a technology survey (which may indicate, for example, that no vendor is currently offering user memory bank 460 of less than 64 bits).

A further consideration is that too large an initial read can result in a memory-overrun error in the tag, yielding no information about how much data the tag does contain (other than it is less than the requested amount). The reader can keep statistics on the probability of overruns in the current tag population, in order to minimize this problem by tempering future initial read requests accordingly.

An algorithm, for $1^{st}$ read of user memory bank 460, the reader always reads 8 bytes (64 bits). This initial read retrieves the DSFID 510, "sys info" byte, and $1^{st}$ 6 bytes of $1^{st}$ packed object 520 (or if there is no DSFID 510, gets first 8 bytes of packed object 520). That typically yields full length information and full ID information.

4. Alternate Embodiments 4.1 Direct Length

A minor modification to the format design of user memory bank 460 described above can be used to provide additional information for optimizing searches. In this alternative embodiment, the exact number of bytes necessary to gather a complete list of all the data ID's of the packet is fully defined (in length bytes at the front of each Packed Object 520) in full 2-to-4 digit form (as well as the full DI identifier if present).

FIG. 18 depicts a flowchart 1800 of an exemplary method for reading a packed object tag using the direct approach, according to embodiments of the present invention. FIG. 18 is described with reference to the user memory bank 460 embodiment illustrated in FIG. 4. However, flowchart 1800 is not limited to that embodiment. Note that the steps of flowchart 1800 do not necessarily have to occur in the order shown.

In step 1810, the reader reads the first 'n' bytes of user memory bank 460, where the defined format layout guarantees that the first bytes fully indicate the number of encoded (non-empty) bytes 'm' that follow in user memory bank 460, and either the complete list of IDs, or a count 'p', indicating exactly how many more bytes must be read in order to obtain that complete list of IDs.

Note that the design decision between the above two choices is a tradeoff: the first alternative forces the initial Read of 'n' bytes to be larger, in order to accommodate the maximum-sized ID list, while the second alternative reduces the size of the initial Read of 'n' bytes, but requires an additional read of 'p' bytes if searching for specific IDs.

In step 1820, a determination is made whether the entire contents of the tag are required. If the entire tag content is required, operation proceeds to step 1830. If the entire tag content is not required, operation proceeds to step 1840.

In step 1830, the reader reads the next 'm' bytes.

In step 1840, the reader obtains just the list of IDs, which (depending on the design tradeoff design that was made) which either was already gathered when reading the first 'n' bytes, or can be gathered by reading the next 'p' bytes.

4.2 Memory Size Indication

The below alternative embodiment encodes a memory-size indication starting in the first byte of user memory bank 460. The purpose of this indicator is so that readers can quickly ascertain the extent of user memory bank 460 in the same Read operation that provides the remainder of necessary system and formatting information. This provides a significant operational advantage over current mechanisms which requires not only a read of a different memory bank (TID) but also a further lookup operation to obtain memory size from the TID.

The encoding of the memory size indicator uses a variable number of bits, which number is controlled by a memory-class indicator bit, to minimize the overhead in "small" tags, which are by nature the most cost-sensitive. A single '0' bit as a memory class indicates a "small" tag whose memory capacity is at or below the threshold (in our embodiments, we've assumed a specified threshold of 256 bits). In this case, where bit savings are of paramount importance, the precise capacity of the tag is not indicated. When an initial Read indicates a "small" tag (along with the other information captured in that first Read), a reader can devise a number of strategies for efficiently completing its operations on that tag, without a critical need to know its precise size.

For example, if a reader chooses to read 64 bits in every initial read, then those bits will also include the length indicator of the first (and possibly only) packed object in memory. The reader can then, for example, choose to execute a second read that is guaranteed to read the remainder of that packed object 520 with no danger of an overrun error. Alternatively, the reader can examine air interface statistics and decide that on average it will be most efficient to execute a Read of all of the remaining bytes in the bank, or even to execute a Read-with a length of zero (causing an entire-bank read operation, again with no risk of an overrun error, even though this will cause a retransmit of the initial 64 bits already obtained from the tag).

A '1' bit in the memory class bit position indicates a larger tag, whose length in bytes is encoded in the second and possibly subsequent bytes in (for example) an EBV-8 format. Since this memory class supports additional feature flags not available in the "small" format, this length indicator includes the range of lengths defined for the "small" format so that a "small" tag with sensor inputs, for example, can use the "large tag" bit format to indicated the sensor feature.

Following the first byte of user memory bank 460 if the memory class indicator indicates a "large" tag is a series of static bits indicating the presence of key hardware-dependent features. Since the position and meaning of these hardware-feature bits should be independent of RAM memory size, these bits precede the variable-length set of memory size bits. If only a single Sensor-IO indicator is deemed necessary by the governing standards bodies, then only a single such bit may be used. Alternately, these "feature bits" may be defined in groups of eight (in an EBV-8 format, as was previously disclosed), to simplify processing of this section and the following section of memory-size bits.

Following this series of static "hardware feature bits" is the memory size indicator, possibly defined as an EBV-8 format. Advantageously, if both the hardware features and memory size indicators are defined in EBV-8 format, they can be byte-aligned in tag memory, possibly simplifying the access-protection mechanism.

All of the above static information is placed at the very front of the User Memory 400, so that two options become available both of which prevent tampering of this key information at the earliest possible stages of a tag's service life. The first Write to tag memory, which formats the tag memory and then writes the first data item to it, can indicate the access method of '11', plus the size and hardware features information (which can, on this one-time basis, be obtained through the TID or other means). This data can then be locked so that it can be trusted in all future operations on the tag. Even the most primitive single lock-pointer solution supports this mode of operation.

Optionally, a tag CPU design can hard-code the '11' Access Indicator, followed by the Memory Class bit and (if so indicated) the hardware features and length section 525. A single CPU mask can be used and the resulting chips sold into all packed object 520 applications without regard to which Data Format the end user will ultimately select. Non-writable memory is far less expensive to implement than non-volatile read/write memory, and thus the chip designer can, using this approach, extend the chip's apparent memory capacity by a byte or two, at virtually no additional cost. A further advantage, of course, is that this critical information is tamper proof because it cannot be incorrectly written nor changed.

Note however, that if this pre-programmed option is selected (whether hard-coded or not) this pre-programmed first byte could conflict with the hardware-controlled memory-used indicator, if EPCglobal chooses to specify that feature. The conflict is that the first byte of user memory bank 460 will contain non-zero contents, even though no user data has yet been written to the tag. The problem is that the '11' indicator is needed in order to signal the presence of the memory class bit and length indicator. If the proposed hardware flag is in fact specified in the future, then a method to resolve the conflict is required.

In a first method, a first-byte pattern of all '1's is reserved as a special indicator. This special first byte pattern would indicate that, although the memory is formatted for packed objects 520 (as implied by the leading '11' bits), the following bits of the first byte do not follow the packed object 520 format. Instead, this special all-ones pattern in the first byte would indicate Factory Pre-Formatting. In this case, the next byte(s) would follow the packed object 520 format (indicating the memory size and hardware features) but would be either locked or non-writeable. If this option were selected, the hardware would need to be designed such that the non-empty flag would be triggered by non-zero contents in the first writeable byte of memory, not necessarily the first byte in the address space.

In an alternative method, since many embodiments of the invention support hard-coding the first three bits of memory (the '11' access method, followed by the Memory Class bit) in both small and large tags, two scenarios develop, based on the tag size. In the more space-constrained case of the "small" tags, the above overhead of five '1's could be avoided. In both cases, the hardware could be simplified to check only the lower five bits of the first byte of memory, instead of all eight bits of that byte. This approach will maintain compatibility with current ISO formatting, so long as ISO agrees to reserve both Format 0 and Format 32 (0x20) to indicate an unformatted tag (since the lowest 5 bits will then be zero in either case).

In "Small" tags, since these are defined a priori to have no "special features" and no Optional External Directory 580, and have no length section 525, then normal Read/Write user memory bank 460 can start at the fourth bit of user memory bank 460 (a Write to the first Word of user memory bank 460 will simply have no effect on the first three bits of that Word). As described below, the fourth bit would be the start of the EBV-3 Data Format indicator. Format 0 would be reserved to indicate an unformatted tag, and by definition the final two bits of the first byte would be mandated to be zero, if the EBV-3 indicates Format 0. Thus, the lower five bits of an unformatted "small" tag can be specified to be all zeroes and detected by the "empty-flag" hardware.

In the "Large" tags case, if it is desired to place all "hardware" data before User data, the EBV-3 Data Format does not follow immediately after the Memory Class bit (instead, it begins after the length indicator). In this case, at least one of the low-order bits in the first byte needs to be read/write accessible as a "non-empty" flag that can be set in the field during the first data write, then permanently locked. In the simplest implementation, all five low-order bits share in controlling the "non-empty" hardware flag in the PC bits. However, a slightly more sophisticated approach would be a hardware design that, if the "memory class" bit is '1', then only a selected bit (e.g., the Least Significant Bit) of the first byte controls the PC bits flag. In this way, the other four low order bits of the first byte would be free for assignment as additional hardware flags (such as to indicate the presence of Sensor inputs), and a separate Hardware Features byte may not be necessary, thus reducing the number of bits that need to be read from each tag.

4.3 Digits Identifier

By default, the defined A/N character sets exclude the 10 digits from their sets (because they are more efficiently handled by the Base 10 set). However, there can be cases where this exclusion can hurt efficiency, notably where a single digit or two within a long run of A/N data prevents the encoder from run-length encoding a large portion of the data (which would have cut down the number of bits in the Character Map). An option would be for the A/N Header definition to include an additional bit, flagging whether or not the Digits are included in the non-numeric base.

4.4 Access Control

The system and methods described above may include additional techniques for controlling access to one or more portions of user memory bank 460. For example, the format may include the ability to incrementally add new data items during the service life of a tag, but with an option to lock existing data items so they cannot be altered. In addition, the format may include the ability to write lock at time of tag manufacture (or optionally hard-code) system information that is known at time of manufacture and will not change thereafter (such as the size of the tag memory and the existence of sensor inputs) and the ability to write-lock any other system information (such as data system format) that cannot be known at time of manufacture The format may also include the ability to support relatively coarse-granularity write-locking schemes that are only incremental improvements over current 180006-c standard. For example, an embodiment includes the addition of a single "lock pointer" hardware register that can be advanced from the first location in user memory bank 460 as additional data items are appended. To support an optional external directory 580, a second "lock pointer" is used that grows down from the last location. In an embodiment, when "small" tags use packed object 520 format, a single such pointer is implemented and an optional external directory 580 is not supported. However, over a certain size (e.g., 256 bits may be selected as the breakpoint in this embodiment), the tag shall support both "lock pointers."

In many applications (such as item-level tagging of pharmaceuticals), it would be desirable to use passwords to restrict write access (and even read access) to some or all of the individual encoded data items. However, it is inherently undesirable to put all of the "control" information listed above under the same access control. For example, if write access to the "currently encoded number of bytes" information is password protected, then every Reader that is instructed to append new information to the tag needs that password. If instead that information is left unprotected, then one could accidentally or maliciously render the tag's protected data contents "invisible" merely by incorrectly changing that one piece of unprotected information.

5. Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system (e.g., a reader) using a removable storage drive, hard drive, or communications interface. The control logic (software), when executed by a processor, causes the processor to perform the functions of the invention as described herein.

According to an example embodiment, a reader may execute computer-readable instructions to provide data to a tag according to the tag data structures described herein. Furthermore, in an embodiment, a tag may execute computer-readable instructions with regard to the disclosed tag data structures, as further described elsewhere herein.

6. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

What is claimed is:

1. A data structure stored in a memory of a radio frequency identification (RFID) tag comprising:
a packed object in the memory of the RFID tag, the packed object including:
a length section including an indication of the number of identifiers in the packed object,
an identifier section including a directory of indices representing an identifier for each data item contained within the packed object;
a data section encoding a data portion associated with each data item included in the identifier section;
wherein the packed object provides a complete list of the data items in the data section without requiring a read of the data section; and
at least two or more of the data items are concatenated and encoded as a single unit, and
wherein the at least two of more of the data items comprise items from different data systems.

2. The data structure of claim 1, wherein the identifier section includes a plurality of subsections.

3. The data structure of claim 1, further comprising:
an external directory, wherein a predefined bit pattern at a predefined memory location indicates the inclusion of an external directory in the data structure.

4. The data structure of claim 1, wherein the data section of the packed object includes a plurality of subsections.

5. The data structure of claim 1, wherein the packed object further includes an auxiliary identifier section, wherein the auxiliary identifier section includes additional information required to decode a data item contained with the packed object.

6. The data structure of claim 1, wherein the number of identifiers field is encoded as an extensible bit vector.

7. The data structure of claim 1, wherein the packed object is encoded and decoded in the memory to minimize a number of encoded bits for a given data set that need to be transferred over an air interface.

8. The data structure of claim 1, wherein the RFID tag comprises a Gen 2 tag.

9. The data structure of claim 1, wherein the packed object provides access of each data item included in the identifier section without incurring bit-overhead of adding a full Directory.

10. The data structure of claim 1, wherein each of the data items in the data section is independently encoded.

11. A radio frequency identification (RFID) tag, comprising:
an antenna;
control logic; and
a memory including a data structure embodied thereon, the data structure comprising:
a packed object in the memory of the RFID tag, the packed object including:
a length section including an indication of the number of identifiers in the packed object,
an identifier section including a directory of indices representing an identifier for each data item contained within the packed object;
a data section encoding a data portion associated with each data item included in the identifier section,
wherein the packed object provides a complete list of the data items in the data section without requiring a read of the data section; and
at least two or more of the data items are concatenated and encoded as a single unit, and
wherein the at least two of more of the data items comprise items from different data systems.

12. The RFID tag of claim 11, wherein the packed object is encoded and decoded in the memory to minimize a number of encoded bits for a given data set that need to be transferred over an air interface.

13. The RFID tag of claim 11, wherein the RFID tag comprises a Gen 2 tag.

14. The RFID tag of claim 11, wherein the packed object provides access of each data item included in the identifier section without incurring bit-overhead of adding a full Directory.

15. The RFID tag of claim 11, wherein each of the data items in the data section is independently encoded.

16. A computing device, comprising:
- a central processing unit; and
- a memory including a data structure embodied thereon, the data structure comprising:
- a packed object in the memory of the RFID tag, the packed object including:
  - a length section including an indication of the number of identifiers in the packed object,
  - an identifier section including a directory of indices representing an identifier for each data item contained within the packed object;
  - a data section encoding a data portion associated with each data item included in the identifier section,
  - wherein the packed object provides a complete list of the data items in the data section without requiring a read of the data section; and
  - at least two or more of the data items are concatenated and encoded as a single unit, and
  - wherein the at least two of more of the data items comprise items from different data systems.

17. The computing device of claim 16, wherein the computing device comprises a Gen 2 tag.

* * * * *

UNITED STATES PATENT AND TRADEMARK OFFICE
CERTIFICATE OF CORRECTION

PATENT NO.       : 7,849,107 B2
APPLICATION NO.  : 11/806050
DATED            : December 7, 2010
INVENTOR(S)      : Schuessler It is certified that error appears in the above-identified patent and that said Letters Patent is hereby corrected as shown below:

On the Title Page, in Item (56), under "FOREIGN PATENT DOCUMENTS", in Column 2, Line 1, delete "1345183 A2 9/2003" and insert -- 1345183 A2 * 9/2003 --, therefor.

On Title Page 2, in Item (56), under "FOREIGN PATENT DOCUMENTS", in Column 1, Line 5, delete "WO 9835243 A2 8/1998".

On Title Page 2, in Item (56), under "FOREIGN PATENT DOCUMENTS", in Column 2, Line 1, delete "WO 2065380 A2 8/2002".

On Title Page 2, in Item (56), under "FOREIGN PATENT DOCUMENTS", in Column 2, Line 3, delete "WO 3021974 A1 3/2003".

On Title Page 2, in Item (56), under "FOREIGN PATENT DOCUMENTS", in Column 2, Line 5, delete "WO 2005073903 A1 8/2005".

On Title Page 2, in Item (56), under "FOREIGN PATENT DOCUMENTS", in Column 2, Line 7, delete "WO 2005081086 A 9/2005".

On Title Page 2, in Item (56), under "OTHER PUBLICATIONS", in Column 2, Lines 5-8, delete "Hughes Metras, ...... and technologies.".

On Title Page 2, in Item (56), under "OTHER PUBLICATIONS", in Column 2, Lines 9-10, delete "Roy Want, ...... digital library.".

In the Drawings
In Fig. 8B, Drawing Sheet 7 of 23, in Table 2, Line 1, delete "ix" and insert -- Fix --, therefor.

In Fig. 8B, Drawing Sheet 7 of 23, in Table 2, Line 2, delete "ength" and insert -- length --, therefor.

Signed and Sealed this
Thirtieth Day of April, 2013

Teresa Stanek Rea
*Acting Director of the United States Patent and Trademark Office*

CERTIFICATE OF CORRECTION (continued)
U.S. Pat. No. 7,849,107 B2

In Fig. 8B, Drawing Sheet 7 of 23, in Table 2, under "Variable length Range", Line 9, delete "0.j5" and insert -- 0.5 --, therefor.

In Fig. 8C, Drawing Sheet 8 of 23, in Table, Line 1, delete "ix" and insert -- Fix --, therefor.

In Fig. 8C, Drawing Sheet 8 of 23, in Table, Line 2, delete "ength" and insert -- length --, therefor.

In Fig. 8D, Drawing Sheet 9 of 23, in Table 3, under "Data Title", Line 12, delete "AuxiD" and insert -- AuxID --, therefor.

In Fig. 8D, Drawing Sheet 9 of 23, in Table 3, under "Data Title", Line 30, delete "AuxJD" and insert -- AuxID --, therefor.

In Fig. 8E, Drawing Sheet 10 of 23, under "Data Title", Line 6, delete "2J]" and insert -- 2] --, therefor.

In Fig. 12B, Drawing Sheet 14 of 23, under "Graphic", Line 13, insert -- h --.

In Fig. 15A, Drawing Sheet 18 of 23, for Tag "1550", Line 2, delete "Non Pad" and insert -- Non-Pad --, therefor.

In Fig. 15C, Drawing Sheet 20 of 23, for Tag "1590", Line 1, delete "NonDlgitBits" and insert -- NonDigitBits --, therefor.

In Fig. 18, Drawing Sheet 23 of 23, for Tag "1810", Line 1, delete " 'n'" " and insert -- 'n' --, therefor.

In the Specifications
In Column 4, Line 62, delete "a IEEE" and insert -- an IEEE --, therefor.

In Column 21, Line 14, delete "theses" and insert -- these --, therefor.

In Column 39, Line 6, after "456", insert -- . --.

In Column 39, Line 23, delete "Oct. 31, 2006" and insert -- "Oct. 31, 2006" --, therefor.

In Column 42, Line 41, delete "indicated" and insert -- indicate --, therefor.

In Column 42, Line 41, delete "indicated" and insert -- indicate --, therefor.

In the Claims
In Column 46, Line 15, in Claim 1, delete "two of more" and insert -- two or more --, therefor.

In Column 46, Line 66, in Claim 11, delete "two of more" and insert -- two or more --, therefor.

In Column 48, Line 13, in Claim 16, delete "two of more" and insert -- two or more --, therefor.